(12) United States Patent
Hirota

(10) Patent No.: US 9,557,191 B2
(45) Date of Patent: Jan. 31, 2017

(54) ROTATING FIELD SENSOR AND ANGLE DETERMINATION METHOD USING THE SAME

(71) Applicant: TDK CORPORATION, Tokyo (JP)

(72) Inventor: Yohei Hirota, Tokyo (JP)

(73) Assignee: TDK CORPORATION, Tokyo (JP)

( * ) Notice: Subject to any disclaimer, the term of this patent is extended or adjusted under 35 U.S.C. 154(b) by 298 days.

(21) Appl. No.: 14/508,101

(22) Filed: Oct. 7, 2014

(65) Prior Publication Data

US 2015/0260546 A1    Sep. 17, 2015

(30) Foreign Application Priority Data

Mar. 17, 2014  (JP) ................................. 2014-053171

(51) Int. Cl.
    *G01D 5/14*    (2006.01)
(52) U.S. Cl.
    CPC ................. *G01D 5/14* (2013.01); *G01D 5/145* (2013.01)
(58) Field of Classification Search
    CPC ............ G01D 5/20; G01D 5/145; G01D 5/14; G01R 33/09; G01R 33/093
    USPC ..................................................... 324/207.21
    See application file for complete search history.

(56) References Cited

U.S. PATENT DOCUMENTS

| | | | | |
|---|---|---|---|---|
| 8,232,795 B2* | 7/2012 | Saruki | ............... | G01D 5/24476 324/207.12 |
| 8,589,105 B2* | 11/2013 | Komasaki | .............. | G01D 5/145 324/207.21 |
| 8,659,289 B2* | 2/2014 | Saruki | .................. | G01R 33/093 324/207.23 |
| 8,909,489 B2* | 12/2014 | Saruki | .................... | G01D 5/145 324/207.21 |
| 2012/0053865 A1 | 3/2012 | Saruki et al. | | |
| 2015/0204696 A1* | 7/2015 | Hirota | .................... | G01D 5/145 324/207.21 |

* cited by examiner

*Primary Examiner* — Melissa Koval
*Assistant Examiner* — Rahul Maini
(74) *Attorney, Agent, or Firm* — Oliff PLC

(57) ABSTRACT

A rotating field sensor includes four detection circuits and a computing unit. In the computing unit, defined are four first detection circuit groups each consisting of three detection circuits. Further, defined in each first detection circuit group are three second detection circuit groups each consisting of two detection circuits. The computing unit calculates an angle value for each of all the second detection circuit groups on the basis of the output signals of the two detection circuits, extracts one or more normal first detection circuit groups each of which is such one that all three angle values corresponding to the three second detection circuit groups fall within an angle range of a predetermined breadth, and determines an angle detection value on the basis of at least one of all angle values corresponding to all second detection circuit groups belonging to the one or more normal first detection circuit groups.

6 Claims, 10 Drawing Sheets

ROTATING FIELD SENSOR AND ANGLE DETERMINATION METHOD USING THE SAME

BACKGROUND OF THE INVENTION

1. Field of the Invention

The present invention relates to a rotating field sensor for detecting an angle that the direction of a rotating magnetic field forms with respect to a reference direction, and to an angle determination method using the rotating field sensor.

2. Description of the Related Art

In recent years, rotating field sensors have been widely used to detect the rotational position of an object in various applications such as detecting the rotational position of an automotive steering wheel. Systems using rotating field sensors are typically provided with means (for example, a magnet) for generating a rotating magnetic field whose direction rotates in response to the rotation of the object. The rotating field sensors use magnetic detection elements to detect the angle that the direction of the rotating magnetic field forms with respect to a reference direction. The rotational position of the object is thus detected.

Among known rotating field sensors is one that includes two bridge circuits (Wheatstone bridge circuits), as described in U.S. Patent Application Publication No. 2012/0053865 A1. In the rotating field sensor disclosed therein, each of the two bridge circuits includes four magnetic detection elements and outputs a signal responsive to the direction of the rotating magnetic field. The output signals of the two bridge circuits are different in phase from each other by ¼ the period of the output signals of the bridge circuits. The output signals of the two bridge circuits are used as a basis for determining an angle detection value which corresponds to the angle that the direction of the rotating magnetic field forms with respect to a reference direction.

U.S. Patent Application Publication No. 2012/0053865 A1 discloses a technique for determining an angle detection value with a reduced error by providing four detection circuits each of which includes a bridge circuit and performing an arithmetic operation using the output signals of the four detection circuits.

A known magnetic detection element for use in a bridge circuit is a magnetoresistive (MR) element that is formed by serially connecting a plurality of MR films each of which exhibits a magnetoresistive effect, as disclosed in U.S. Patent Application Publication No. 2012/0053865 A1, for example.

In the case of a rotating field sensor including two bridge circuits as described above, the determined angle detection value is no longer correct if at least one of the two bridge circuits fails.

U.S. Patent Application Publication No. 2012/0053865 A1 discloses a method including monitoring the resistances of the bridge circuits, the potentials at two output ports of each bridge circuit, the magnitude of a signal corresponding to a potential difference between the two output ports, or the like. According to the method, a bridge circuit is determined to be in failure if the monitored value exceeds a predetermined range of the normal value.

The foregoing method is able to detect such a failure of a bridge circuit that the monitored value deviates greatly from the normal value due to, for example, the occurrence of a break in any location in the bridge circuit or the occurrence of a short circuit across a magnetic detection element. Disadvantageously, however, the foregoing method is not able to detect such a failure of a bridge circuit that the monitored value deviates from the normal value by a relatively small amount. Such a failure can occur, for example, when one of the plurality of MR films connected in series to constitute an MR element is short-circuited or when the plurality of MR films become anisotropic.

U.S. Patent Application Publication No. 2012/0053865 A1 further discloses a technique for determining, in the case of a failure of one of the four bridge circuits, the angle detection value by an arithmetic operation using the output signals of two of the four bridge circuits other than the failed bridge circuit. This technique, however, is not able to detect such a failure of a bridge circuit that the monitored value deviates from the normal value by a relatively small amount, as described above. If such a failure occurs, it is not possible to identify two bridge circuits that are other than the failed bridge circuit, and consequently, it is not possible to determine a correct angle detection value.

The descriptions so far have dealt with the problem with a rotating field sensor that determines an angle detection value by using the output signals of two bridge circuits. However, the foregoing problem applies to all rotating field sensors that include a plurality of detection circuits each configured to output a signal responsive to the direction of a rotating magnetic field.

OBJECT AND SUMMARY OF THE INVENTION

It is an object of the present invention to provide a rotating field sensor including a plurality of detection circuits each configured to output a signal responsive to the direction of a rotating magnetic field, the rotating field sensor being enabled to output a correct angle detection value even if one of the detection circuits fails, and to provide an angle determination method using such a rotating field sensor.

A rotating field sensor of the present invention is for detecting an angle that the direction of a rotating magnetic field in a reference position forms with respect to a reference direction. The rotating field sensor includes N detection circuits. Each of the N detection circuits includes at least one magnetic detection element and generates an output signal responsive to the direction of the rotating magnetic field. The rotating field sensor further includes a computing unit for performing a computation for determining an angle detection value to be output from the rotating field sensor, by using N output signals of the N detection circuits. The angle detection value has a correspondence relationship with the angle that the direction of the rotating magnetic field in the reference position forms with respect to the reference direction. In the computing unit, G first detection circuit groups are defined and further, g second detection circuit groups are defined in each of the G first detection circuit groups. Each of the G first detection circuit groups consists of M detection circuits selected from the N detection circuits. Each of the g second detection circuit groups consists of m detection circuits selected from the M detection circuits. N is an integer not less than four. M is an integer not less than three and not more than (N−1). Each of the N detection circuits belongs to one or more and not more than (G−1) of the G first detection circuit groups. Further, m is an integer not less than two and not more than (M−1), and g is an integer not less than M/m and not more than $_MC_m$. In each of the G first detection circuit groups, each of the M detection circuits belongs to one or more and not more than (g−1) of the g second detection circuit groups.

The computing unit includes an angle calculation unit and an angle determination unit. The angle calculation unit calculates an angle value for each of all the second detection circuit groups on the basis of m output signals of the m detection circuits. The angle value has a correspondence relationship with the angle that the direction of the rotating magnetic field in the reference position forms with respect to the reference direction. The angle determination unit extracts one or more normal first detection circuit groups from the G first detection circuit groups, each of the one or more normal first detection circuit groups being such a first detection circuit group that all g angle values corresponding to the g second detection circuit groups belonging thereto fall within an angle range of a predetermined breadth, and determines the angle detection value on the basis of at least one of all angle values corresponding to all second detection circuit groups belonging to the one or more normal first detection circuit groups.

In the rotating field sensor of the present invention, g may be greater than or equal to M. In each of the G first detection circuit groups, each of the M detection circuits may belong to m or more second detection circuit groups. In this case, the computing unit may further include a failure detection unit for identifying, in the case of a failure of one of the N detection circuits, the failed detection circuit. The failure detection unit is configured to: set an angle value range of a predetermined breadth in which all angle values corresponding to all second detection circuit groups belonging to the one or more normal first detection circuit groups are included as a normal angle value range; extract a plurality of abnormal first detection circuit groups other than the one or more normal first detection circuit groups from the G first detection circuit groups; classify all angle values corresponding to all second detection circuit groups belonging to the plurality of abnormal first detection circuit groups into normal angle values falling within the normal angle value range and abnormal angle values falling outside the normal angle value range; and identify a detection circuit that belongs to all second detection circuit groups corresponding to all the abnormal angle values and does not belong to any of second detection circuit groups corresponding to all the normal angle values as the failed detection circuit.

An angle determination method of the present invention is a method for determining an angle detection value by using a rotating field sensor. The angle detection value has a correspondence relationship with the angle that the direction of a rotating magnetic field in a reference position forms with respect to a reference direction. The rotating field sensor includes N detection circuits and is configured to output the angle detection value. Each of the N detection circuits includes at least one magnetic detection element and generates an output signal responsive to the direction of the rotating magnetic field.

G first detection circuit groups are defined in advance. Further, g second detection circuit groups are defined in each of the G first detection circuit groups in advance. Each of the G first detection circuit groups consists of M detection circuits selected from the N detection circuits. Each of the g second detection circuit groups consists of m detection circuits selected from the M detection circuits. N is an integer not less than four. M is an integer not less than three and not more than (N−1). Each of the N detection circuits belongs to one or more and not more than (G−1) of the G first detection circuit groups. Further, m is an integer not less than two and not more than (M−1), and g is an integer not less than M/m and not more than $_MC_m$. In each of the G first detection circuit groups, each of the M detection circuits belongs to one or more and not more than (g−1) of the g second detection circuit groups.

The angle determination method of the present invention determines the angle detection value by performing a computation using N output signals of the N detection circuits. The angle determination method includes a first step and a second step. The first step calculates an angle value for each of all the second detection circuit groups on the basis of m output signals of the m detection circuits. The angle value has a correspondence relationship with the angle that the direction of the rotating magnetic field in the reference position forms with respect to the reference direction. The second step extracts one or more normal first detection circuit groups from the G first detection circuit groups, each of the one or more normal first detection circuit groups being such a first detection circuit group that all g angle values corresponding to the g second detection circuit groups belonging thereto fall within an angle range of a predetermined breadth, and determines the angle detection value on the basis of at least one of all angle values corresponding to all second detection circuit groups belonging to the one or more normal first detection circuit groups.

In the angle determination method of the present invention, g may be greater than or equal to M. In each of the G first detection circuit groups, each of the M detection circuits may belong to m or more second detection circuit groups. In this case, the angle determination method may further include a third step of identifying, in the case of a failure of one of the N detection circuits, the failed detection circuit. The third step includes: setting an angle value range of a predetermined breadth in which all angle values corresponding to all second detection circuit groups belonging to the one or more normal first detection circuit groups are included as a normal angle value range; extracting a plurality of abnormal first detection circuit groups other than the one or more normal first detection circuit groups from the G first detection circuit groups; classifying all angle values corresponding to all second detection circuit groups belonging to the plurality of abnormal first detection circuit groups into normal angle values falling within the normal angle value range and abnormal angle values falling outside the normal angle value range; and identifying a detection circuit that belongs to all second detection circuit groups corresponding to all the abnormal angle values and does not belong to any of second detection circuit groups corresponding to all the normal angle values as the failed detection circuit.

In the rotating field sensor and the angle determination method of the present invention, the at least one magnetic detection element may be at least one magnetoresistive element including: a magnetization pinned layer whose magnetization direction is pinned; a free layer whose magnetization direction varies depending on the direction of the rotating magnetic field; and a nonmagnetic layer disposed between the magnetization pinned layer and the free layer.

According to the rotating field sensor and the angle determination method of the present invention, even if one of the N detection circuits fails, there exists at least one first detection circuit group that the failed detection circuit does not belong to. The at least one first detection circuit group that the failed detection circuit does not belong to is distinguishable because all g angle values corresponding to the g second detection circuit groups belonging thereto fall within an angle range of a predetermined breadth. By using such a characteristic, in the present invention, one or more normal first detection circuit groups are extracted, and the angle detection value is determined on the basis of at least one of all angle values corresponding to all second detection circuit groups belonging to the one or more normal first detection circuit groups. Consequently, according to the present invention, the rotating field sensor including a plurality of detection circuits each configured to output a signal responsive to the direction of the rotating magnetic field is enabled to output a correct angle detection value even if one of the detection circuits fails.

Other and further objects, features and advantages of the present invention will appear more fully from the following description.

DETAILED DESCRIPTION OF THE PREFERRED EMBODIMENTS

First Embodiment

Figure 1:
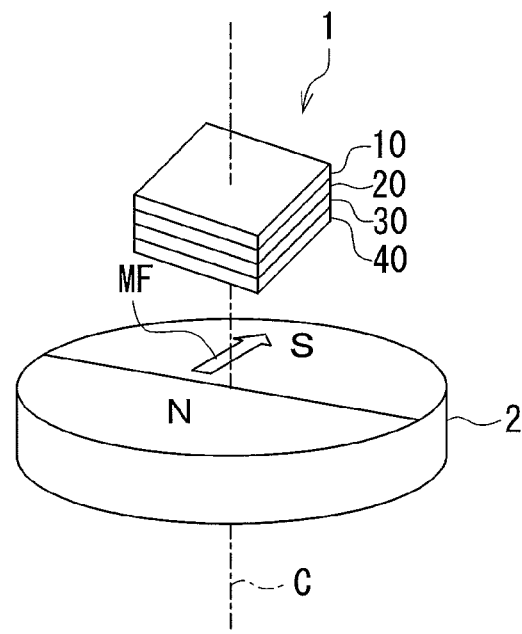
FIG. 1 is a perspective view illustrating the general configuration of a rotating field sensor according to a first embodiment of the invention.
Figure 2:
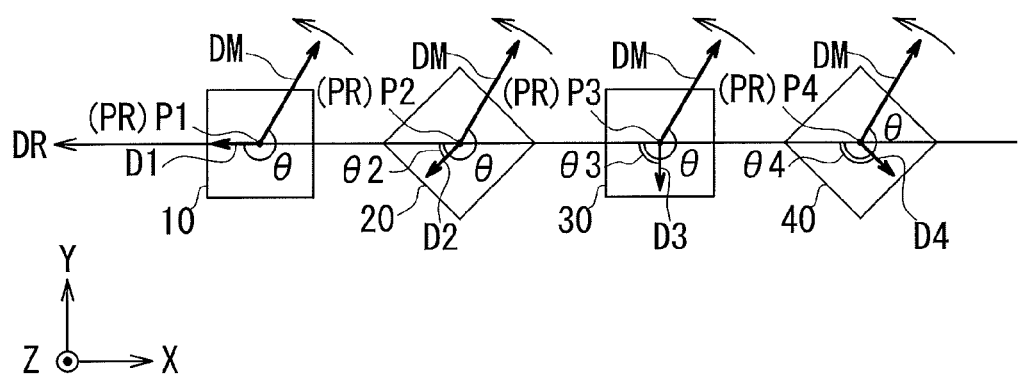
FIG. 2 is an explanatory diagram illustrating the definitions of directions and angles used in the first embodiment of the invention.

Preferred embodiments of the present invention will now be described in detail with reference to the drawings. First, reference is made to FIG. 1 and FIG. 2 to describe the general configuration of a rotating field sensor according to a first embodiment of the invention. FIG. 1 is a perspective view illustrating the general configuration of the rotating field sensor according to the first embodiment. FIG. 2 is an explanatory diagram illustrating the definitions of directions and angles used in the first embodiment.

As shown in FIG. 1, the rotating field sensor 1 according to the first embodiment is configured to detect the angle that the direction of a rotating magnetic field MF in a reference position forms with respect to a reference direction. The direction of the rotating magnetic field MF in the reference position rotates when viewed from the rotating field sensor 1. In FIG. 1, a magnet 2 having a cylindrical shape is shown as an example of means for generating the rotating magnetic field MF. The magnet 2 has an N pole and an S pole that are arranged symmetrically with respect to a virtual plane including the central axis of the cylindrical shape. The magnet 2 rotates about the central axis of the cylindrical shape. Consequently, the direction of the rotating magnetic field MF generated by the magnet 2 rotates about a center of rotation C including the central axis of the cylindrical shape.

The reference position is located within a virtual plane parallel to an end face of the magnet 2. This virtual plane will hereinafter be referred to as the reference plane. In the reference plane, the direction of the rotating magnetic field MF generated by the magnet 2 rotates about the reference position. The reference direction is located within the reference plane and intersects the reference position. In the following description, the direction of the rotating magnetic field MF in the reference position refers to a direction located within the reference plane. The rotating field sensor 1 is disposed to face the aforementioned end face of the magnet 2. As will be described later in relation to other embodiments, the means for generating the rotating magnetic field MF is not limited to the magnet 2 shown in FIG. 1.

Definitions of directions and angles used in the first embodiment will now be described with reference to FIG. 1 and FIG. 2. First, the direction parallel to the center of rotation C shown in FIG. 1 and from bottom to top in FIG. 1 is defined as the Z direction. In FIG. 2, the Z direction is shown as the direction out of the plane of FIG. 2. Next, two directions that are perpendicular to the Z direction and orthogonal to each other are defined as the X direction and the Y direction. In FIG. 2, the X direction is shown as the rightward direction, and the Y direction is shown as the upward direction. Further, the direction opposite to the X direction is defined as the −X direction, and the direction opposite to the Y direction is defined as the −Y direction.

The reference position PR is the position where the rotating field sensor 1 detects the rotating magnetic field MF. The reference direction DR shall be the −X direction. The angle that the direction DM of the rotating magnetic field MF in the reference position PR forms with respect to the reference direction DR will be denoted by symbol θ. The direction DM of the rotating magnetic field MF shall rotate counterclockwise in FIG. 2. The angle θ will be expressed in a positive value when seen counterclockwise from the reference direction DR, and in a negative value when seen clockwise from the reference direction DR. The rotating field sensor 1 outputs an angle detection value θs having a correspondence relationship with the angle θ.

The rotating field sensor 1 includes N detection circuits and a computing unit. Each of the N detection circuits includes at least one magnetic detection element and generates an output signal responsive to the direction DM of the rotating magnetic field MF. The computing unit performs a computation for determining the angle detection value θs by using N output signals of the N detection circuits.

In the computing unit, G first detection circuit groups are defined and further, g second detection circuit groups are defined in each of the G first detection circuit groups. Each of the G first detection circuit groups consists of M detection circuits selected from the N detection circuits. Each of the g second detection circuit groups consists of m detection circuits selected from the M detection circuits. It is required that N be an integer not less than four. This will hereinafter be referred to as requirement 1. It is required that M be an integer not less than three and not more than (N−1). This will hereinafter be referred to as requirement 2. It is required that each of the N detection circuits belong to one or more and not more than (G−1) of the G first detection circuit groups. This will hereinafter be referred to as requirement 3. It is required that m be an integer not less than two and not more than (M−1). This will hereinafter be referred to as requirement 4. It is required that g be an integer not less than M/m and not more than $_MC_m$. This will hereinafter be referred to as requirement 5. It is required that in each of the G first detection circuit groups, each of the M detection circuits belong to one or more and not more than (g−1) of the g second detection circuit groups. This will hereinafter be referred to as requirement 6. The meanings of requirements 1 to 6 will be described in detail later.

The computing unit includes an angle calculation unit and an angle determination unit. The angle calculation unit calculates an angle value for each of all the second detection circuit groups on the basis of m output signals of the m detection circuits. The angle value has a correspondence relationship with the angle θ. The angle determination unit extracts one or more normal first detection circuit groups from the G first detection circuit groups. Each of the one or more normal first detection circuit groups is such a first detection circuit group that all g angle values corresponding to the g second detection circuit groups belonging thereto fall within an angle range of a predetermined breadth. The angle determination unit then determines the angle detection value θs on the basis of at least one of all angle values corresponding to all second detection circuit groups belonging to the one or more normal first detection circuit groups.

In addition to requirement 5, a requirement that g be greater than or equal to M may be satisfied. Such a requirement will hereinafter be referred to as requirement 7. Further, in addition to requirement 6, a requirement that in each of the G first detection circuit groups, each of the M detection circuits belong to m or more second detection circuit groups may be satisfied. Such a requirement will hereinafter be referred to as requirement 8. Where the rotating field sensor 1 satisfies requirements 7 and 8, the computing unit may further include a failure detection unit for identifying, in the case of a failure of one of the N detection circuits, the failed detection circuit. The failure detection unit identifies the failed detection circuit in the following manner. First, the failure detection unit sets an angle value range of a predetermined breadth in which all angle values corresponding to all second detection circuit groups belonging to the one or more normal first detection circuit groups are included as a normal angle value range. Then, the failure detection unit extracts a plurality of abnormal first detection circuit groups other than the one or more normal first detection circuit groups from the G first detection circuit groups. Next, the failure detection unit classifies all angle values corresponding to all second detection circuit groups belonging to the plurality of abnormal first detection circuit groups into normal angle values falling within the normal angle value range and abnormal angle values falling outside the normal angle value range. The failure detection circuit then identifies a detection circuit that belongs to all second detection circuit groups corresponding to all the abnormal angle values and does not belong to any of second detection circuit groups corresponding to all the normal angle values as the failed detection circuit. The meanings of requirements 7 and 8 will be described in detail later.

In the first embodiment, failures of a detection circuit include such ones that the output signal of the detection circuit deviates from a predetermined normal value by a relatively small amount. Such failures can occur, for example, when one of a plurality of MR films to be described later is short-circuited or when the plurality of MR films become anisotropic. The rotating field sensor 1 according to the first embodiment is able to output a correct angle detection value θs even if one of the N detection circuits fails. The rotating field sensor 1 satisfying requirements 7 and 8 is further able to identify the failed detection circuit.

An overview of an angle determination method according to the first embodiment will now be described. The angle determination method according to the first embodiment determines the angle detection value θs by using the rotating field sensor 1 according to the first embodiment. More specifically, the angle determination method according to the first embodiment performs a computation using N output signals of the N detection circuits of the rotating field sensor 1 according to the first embodiment, and thereby determines the angle detection value θs to be output from the rotating field sensor 1. G first detection circuit groups are defined in advance. Further, g second detection circuit groups are defined in each of the G first detection circuit groups in advance. Each of the G first detection circuit groups consists of M detection circuits selected from the N detection circuits. Each of the g second detection circuit groups consists of m detection circuits selected from the M detection circuits. The angle determination method according to the first embodiment satisfies the foregoing requirements 1 to 6.

The angle determination method according to the first embodiment includes a first step and a second step. The first step calculates an angle value for each of all the second detection circuit groups on the basis of m output signals of the m detection circuits. The angle value has a correspondence relationship with the angle θ. The second step extracts one or more normal first detection circuit groups from the G first detection circuit groups, each of the one or more normal first detection circuit groups being such a first detection circuit group that all g angle values corresponding to the g second detection circuit groups belonging thereto fall within an angle range of a predetermined breadth, and determines the angle detection value θs on the basis of at least one of all angle values corresponding to all second detection circuit groups belonging to the one or more normal first detection circuit groups.

The angle determination method according to the first embodiment may further satisfy the foregoing requirements 7 and 8. In such a case, the angle determination method according to the first embodiment may further include a third step of identifying, in the case of a failure of one of the N detection circuits, the failed detection circuit. In the third step, first, an angle value range of a predetermined breadth in which all angle values corresponding to all second detection circuit groups belonging to the one or more normal first detection circuit groups are included is set as a normal angle value range. Next, a plurality of abnormal first detection circuit groups other than the one or more normal first detection circuit groups are extracted from the G first detection circuit groups. Next, all angle values corresponding to all second detection circuit groups belonging to the plurality of abnormal first detection circuit groups are classified into normal angle values falling within the normal angle value range and abnormal angle values falling outside the normal angle value range. Next, a detection circuit that belongs to all second detection circuit groups corresponding to all the abnormal angle values and does not belong to any of second detection circuit groups corresponding to all the normal angle values is identified as the failed detection circuit.

To facilitate understanding of the rotating field sensor 1 and the angle determination method according to the first embodiment, a practical example of the rotating field sensor 1 and a practical example of the angle determination method will be described below. The rotating field sensor 1 and the angle determination method according to the first embodiment will subsequently be described in a conceptual manner.

The rotating field sensor 1 of the practical example satisfies the foregoing requirements 1 to 8. In the rotating field sensor 1 of the practical example, N is four, M is three, G is four, m is two, and g is three. Each of the four detection circuits belongs to three first detection circuit groups. In each first detection circuit group, each of the three detection circuits belongs to two second detection circuit groups.

Figure 3:
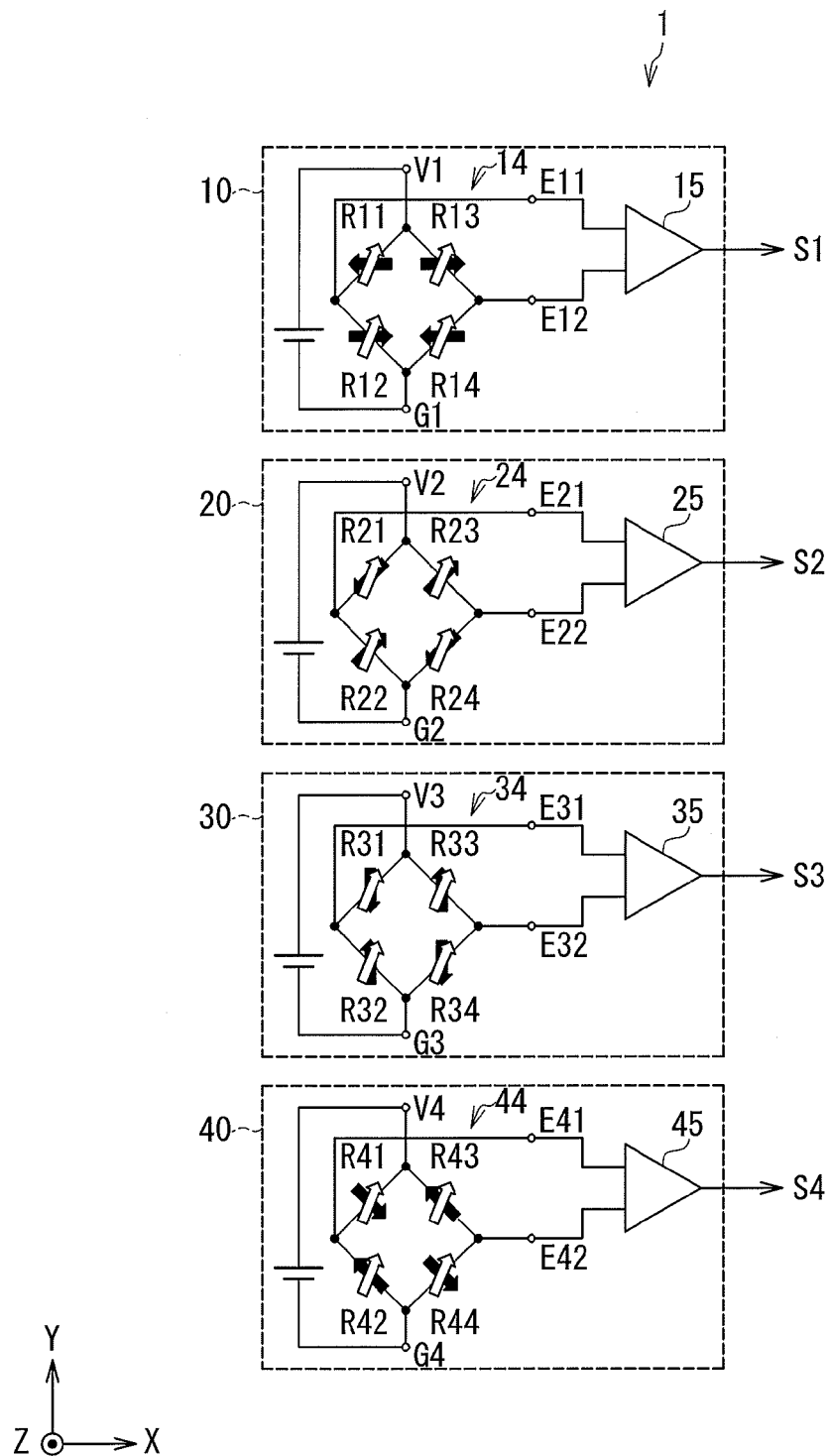
FIG. 3 is a circuit diagram illustrating detection circuits of the rotating field sensor according to the first embodiment of the invention.

FIG. 3 is a circuit diagram illustrating the detection circuits of the rotating field sensor 1 of the practical example. As shown in FIG. 3, the rotating field sensor 1 of the practical example includes four detection circuits, that is, a first detection circuit 10, a second detection circuit 20, a third detection circuit 30, and a fourth detection circuit 40. To facilitate understanding, the first to fourth detection circuits 10, 20, 30 and 40 are depicted as separate components in FIG. 1. However, the first to fourth detection circuits 10, 20, 30 and 40 may be integrated into a single component. Further, while in FIG. 1 the first to fourth detection circuits 10, 20, 30 and 40 are stacked in a direction parallel to the center of rotation C, the order of stacking is not limited to the example shown in FIG. 1.

The position where the first detection circuit 10 is located will be referred to as the first position P1, the position where the second detection circuit 20 is located will be referred to as the second position P2, the position where the third detection circuit 30 is located will be referred to as the third position P3, and the position where the fourth detection circuit 40 is located will be referred to as the fourth position P4. In the practical example, the first to fourth positions P1 to P4 are the same in the direction of rotation of the rotating magnetic field MF, and coincide with the reference position PR.

Each of the first to fourth detection circuits 10, 20, 30 and 40 includes at least one magnetic detection element. The first to fourth detection circuits 10, 20, 30 and 40 generate first to fourth output signals, respectively, each of the first to fourth output signals being responsive to the direction DM of the rotating magnetic field MF. More specifically, the first detection circuit 10 generates a first output signal S1 corresponding to the relative angle between the direction DM of the rotating magnetic field MF and a first direction D1. The first output signal S1 is maximum when the direction DM of the rotating magnetic field MF is the same as the first direction D1. The second detection circuit 20 generates a second output signal S2 corresponding to the relative angle between the direction DM of the rotating magnetic field MF and a second direction D2. The second output signal S2 is maximum when the direction DM of the rotating magnetic field MF is the same as the second direction D2. The third detection circuit 30 generates a third output signal S3 corresponding to the relative angle between the direction DM of the rotating magnetic field MF and a third direction D3. The third output signal S3 is maximum when the direction DM of the rotating magnetic field MF is the same as the third direction D3. The fourth detection circuit 40 generates a fourth output signal S4 corresponding to the relative angle between the direction DM of the rotating magnetic field MF and a fourth direction D4. The fourth output signal S4 is maximum when the direction DM of the rotating magnetic field MF is the same as the fourth direction D4.

In the practical example, as shown in FIG. 2, the first direction D1 is the same as the reference direction DR (the −X direction). The second direction D2 is the direction rotated counterclockwise by θ2 from the first direction D1 (the reference direction DR). The third direction D3 is the direction rotated counterclockwise by θ3 from the first direction D1. The fourth direction D4 is the direction rotated counterclockwise by θ4 from the first direction D1. In the practical example, θ2, θ3 and θ4 are specifically 45°, 90° and 135°, respectively. The third direction D3 is the same as the −Y direction.

The first to fourth output signals S1 to S4 vary periodically with a predetermined signal period T, and are different in phase from each other. Ideally, the waveform of each of the first to fourth output signals S1 to S4 should trace a sinusoidal curve (including a sine waveform and a cosine waveform). The phase difference between the first output signal S1 and the second output signal S2 has an absolute value of 45°. The phase difference between the first output signal S1 and the third output signal S3 has an absolute value of 90°. The phase difference between the first output signal S1 and the fourth output signal S4 has an absolute value of 135°. The phase difference between the second output signal S2 and the third output signal S3 and the phase difference between the third output signal S3 and the fourth output signal S4 both have an absolute value of 45°. In consideration of the production accuracy of the magnetic detection elements and other factors, the absolute values of the aforementioned phase differences may be slightly different from those mentioned above.

As shown in FIG. 3, the first detection circuit 10 includes a Wheatstone bridge circuit 14, a difference detector 15, a power supply port V1, and a ground port G1. The Wheatstone bridge circuit 14 includes a first pair of serially connected magnetic detection elements R11 and R12, a second pair of serially connected magnetic detection elements R13 and R14, and two output ports E11 and E12. Each of the magnetic detection elements R11 and R13 has a first end connected to the power supply port V1. The magnetic detection element R11 has a second end connected to a first end of the magnetic detection element R12 and the output port E11. The magnetic detection element R13 has a second end connected to a first end of the magnetic detection element R14 and the output port E12. Each of the magnetic detection elements R12 and R14 has a second end connected to the ground port G1. A predetermined voltage is applied between the power supply port V1 and the ground port G1. The difference detector 15 has two inputs connected to the output ports E11 and E12, and an output. The difference detector 15 outputs a signal corresponding to the potential difference between the output ports E11 and E12 as the first output signal S1.

The second to fourth detection circuits 20, 30 and 40 are configured in the same manner as the first detection circuit 10. More specifically, the second detection circuit 20 includes a Wheatstone bridge circuit 24, a difference detector 25, a power supply port V2, and a ground port G2. The Wheatstone bridge circuit 24 includes a first pair of serially connected magnetic detection elements R21 and R22, a second pair of serially connected magnetic detection elements R23 and R24, and two output ports E21 and E22. Each of the magnetic detection elements R21 and R23 has a first end connected to the power supply port V2. The magnetic detection element R21 has a second end connected to a first end of the magnetic detection element R22 and the output port E21. The magnetic detection element R23 has a second end connected to a first end of the magnetic detection element R24 and the output port E22. Each of the magnetic detection elements R22 and R24 has a second end connected to the ground port G2. A predetermined voltage is applied between the power supply port V2 and the ground port G2. The difference detector 25 has two inputs connected to the output ports E21 and E22, and an output. The difference detector 25 outputs a signal corresponding to the potential difference between the output ports E21 and E22 as the second output signal S2.

The third detection circuit 30 includes a Wheatstone bridge circuit 34, a difference detector 35, a power supply port V3, and a ground port G3. The Wheatstone bridge circuit 34 includes a first pair of serially connected magnetic detection elements R31 and R32, a second pair of serially connected magnetic detection elements R33 and R34, and two output ports E31 and E32. Each of the magnetic detection elements R31 and R33 has a first end connected to the power supply port V3. The magnetic detection element R31 has a second end connected to a first end of the magnetic detection element R32 and the output port E31. The magnetic detection element R33 has a second end connected to a first end of the magnetic detection element R34 and the output port E32. Each of the magnetic detection elements R32 and R34 has a second end connected to the ground port G3. A predetermined voltage is applied between the power supply port V3 and the ground port G3. The difference detector 35 has two inputs connected to the output ports E31 and E32, and an output. The difference detector 35 outputs a signal corresponding to the potential difference between the output ports E31 and E32 as the third output signal S3.

The fourth detection circuit 40 includes a Wheatstone bridge circuit 44, a difference detector 45, a power supply port V4, and a ground port G4. The Wheatstone bridge circuit 44 includes a first pair of serially connected magnetic detection elements R41 and R42, a second pair of serially connected magnetic detection elements R43 and R44, and two output ports E41 and E42. Each of the magnetic detection elements R41 and R43 has a first end connected to the power supply port V4. The magnetic detection element R41 has a second end connected to a first end of the magnetic detection element R42 and the output port E41. The magnetic detection element R43 has a second end connected to a first end of the magnetic detection element R44 and the output port E42. Each of the magnetic detection elements R42 and R44 has a second end connected to the ground port G4. A predetermined voltage is applied between the power supply port V4 and the ground port G4. The difference detector 45 has two inputs connected to the output ports E41 and E42, and an output. The difference detector 45 outputs a signal corresponding to the potential difference between the output ports E41 and E42 as the fourth output signal S4.

In the practical example, all the magnetic detection elements included in the Wheatstone bridge circuits (hereinafter referred to as bridge circuits) 14, 24, 34 and 44 are magnetoresistive (MR) elements, and more specifically, spin-valve MR elements. The spin-valve MR elements may be TMR elements or GMR elements. GMR and TMR elements each include a magnetization pinned layer whose magnetization direction is pinned, a free layer which is a magnetic layer whose magnetization direction varies depending on the direction DM of the rotating magnetic field MF, and a nonmagnetic layer disposed between the magnetization pinned layer and the free layer. For TMR elements, the nonmagnetic layer is a tunnel barrier layer. For GMR elements, the nonmagnetic layer is a nonmagnetic conductive layer. Each of TMR and GMR elements varies in resistance depending on the angle that the magnetization direction of the free layer forms with respect to the magnetization direction of the magnetization pinned layer, and has a minimum resistance when the foregoing angle is 0°, and a maximum resistance when the foregoing angle is 180°. In the following description, the magnetic detection elements included in the bridge circuits 14, 24, 34 and 44 will be referred to as MR elements. In FIG. 3, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements R11 and R14 are magnetized in the first direction D1 (the −X direction) shown in FIG. 2, and the magnetization pinned layers of the MR elements R12 and R13 are magnetized in the opposite direction to the magnetization direction of the magnetization pinned layers of the MR elements R11 and R14. In this case, the potential difference between the output ports E11 and E12 varies depending on the relative angle between the direction DM of the rotating magnetic field MF and the first direction D1. In this manner, the first output signal S1 responsive to the direction DM of the rotating magnetic field MF is generated by the first detection circuit 10.

In the second detection circuit 20, the magnetization pinned layers of the MR elements R21 and R24 are magnetized in the second direction D2 shown in FIG. 2, and the magnetization pinned layers of the MR elements R22 and R23 are magnetized in the opposite direction to the magnetization direction of the magnetization pinned layers of the MR elements R21 and R24. In this case, the potential difference between the output ports E21 and E22 varies depending on the relative angle between the direction DM of the rotating magnetic field MF and the second direction D2. In this manner, the second output signal S2 responsive to the direction DM of the rotating magnetic field MF is generated by the second detection circuit 20.

In the third detection circuit 30, the magnetization pinned layers of the MR elements R31 and R34 are magnetized in the third direction D3 (the −Y direction) shown in FIG. 2, and the magnetization pinned layers of the MR elements R32 and R33 are magnetized in the opposite direction to the magnetization direction of the magnetization pinned layers of the MR elements R31 and R34. In this case, the potential difference between the output ports E31 and E32 varies depending on the relative angle between the direction DM of the rotating magnetic field MF and the third direction D3. In this manner, the third output signal S3 responsive to the direction DM of the rotating magnetic field MF is generated by the third detection circuit 30.

In the fourth detection circuit 40, the magnetization pinned layers of the MR elements R41 and R44 are magnetized in the fourth direction D4 shown in FIG. 2, and the magnetization pinned layers of the MR elements R42 and R43 are magnetized in the opposite direction to the magnetization direction of the magnetization pinned layers of the MR elements R41 and R44. In this case, the potential difference between the output ports E41 and E42 varies depending on the relative angle between the direction DM of the rotating magnetic field MF and the fourth direction D4. In this manner, the fourth output signal S4 responsive to the direction DM of the rotating magnetic field MF is generated by the fourth detection circuit 40.

In consideration of the production accuracy of the MR elements and other factors, the magnetization directions of the magnetization pinned layers of the plurality of MR elements in the detection circuits 10, 20, 30 and 40 may be slightly different from those described above.

The bridge circuits 14, 24, 34 and 44 may have the same mechanical structure and be placed in the same orientation, with only the magnetization directions of the plurality of magnetization pinned layers included therein varied among the bridge circuits 14, 24, 34 and 44, as shown in FIG. 3. Alternatively, in addition to having the same mechanical structure, the bridge circuits 14, 24, 34 and 44 may be configured so that the magnetizations of the plurality of magnetization pinned layers included therein are in the same relative direction with respect to the mechanical structure. In this case, placing the bridge circuits 14, 24, 34 and 44 in orientations different from each other allows the magnetization directions of the plurality of magnetization pinned layers included therein to be varied among the bridge circuits 14, 24, 34 and 44 as shown in FIG. 3.

Figure 6:
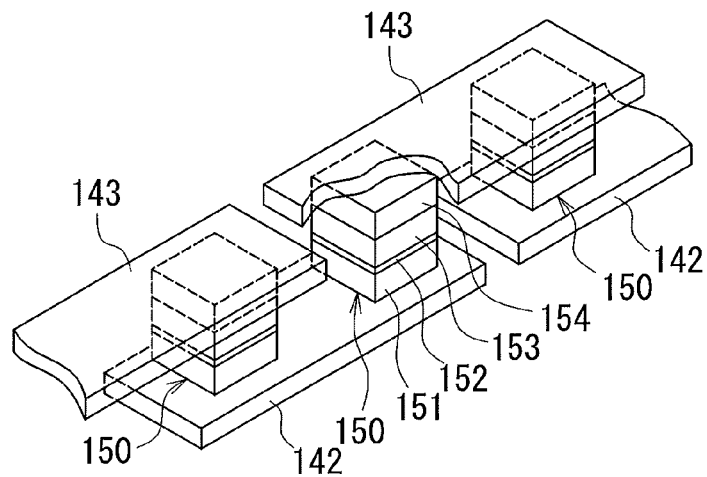
FIG. 6 is a perspective view of a portion of an MR element shown in FIG. 3.

An example of the configuration of the MR elements will now be described with reference to FIG. 6. FIG. 6 is a perspective view illustrating a portion of an MR element in the rotating field sensor 1 shown in FIG. 3. In this example, the MR element includes a plurality of lower electrodes 142, a plurality of MR films 150 and a plurality of upper electrodes 143. The plurality of lower electrodes 142 are arranged on a substrate (not illustrated). Each of the lower electrodes 142 has a long slender shape. Every two lower electrodes 142 that adjoin in the longitudinal direction of the lower electrodes 142 have a gap therebetween. As shown in FIG. 6, MR films 150 are provided on the top surfaces of the lower electrodes 142, near opposite ends in the longitudinal direction. Each of the MR films 150 includes a free layer 151, a nonmagnetic layer 152, a magnetization pinned layer 153, and an antiferromagnetic layer 154 which are stacked in this order, the free layer 151 being closest to the lower electrode 142. The free layer 151 is electrically connected to the lower electrode 142. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 143 are arranged over the plurality of MR films 150. Each of the upper electrodes 143 has a long slender shape, and establishes electrical connection between the respective antiferromagnetic layers 154 of two adjoining MR films 150 that are arranged on two lower electrodes 142 adjoining in the longitudinal direction of the lower electrodes 142. With such a configuration, the plurality of MR films 150 in the MR element shown in FIG. 6 are connected in series by the plurality of lower electrodes 142 and the plurality of upper electrodes 143. It should be appreciated that the layers 151 to 154 of the MR films 150 may be stacked in an order reverse to that shown in FIG. 6.

Figure 4:
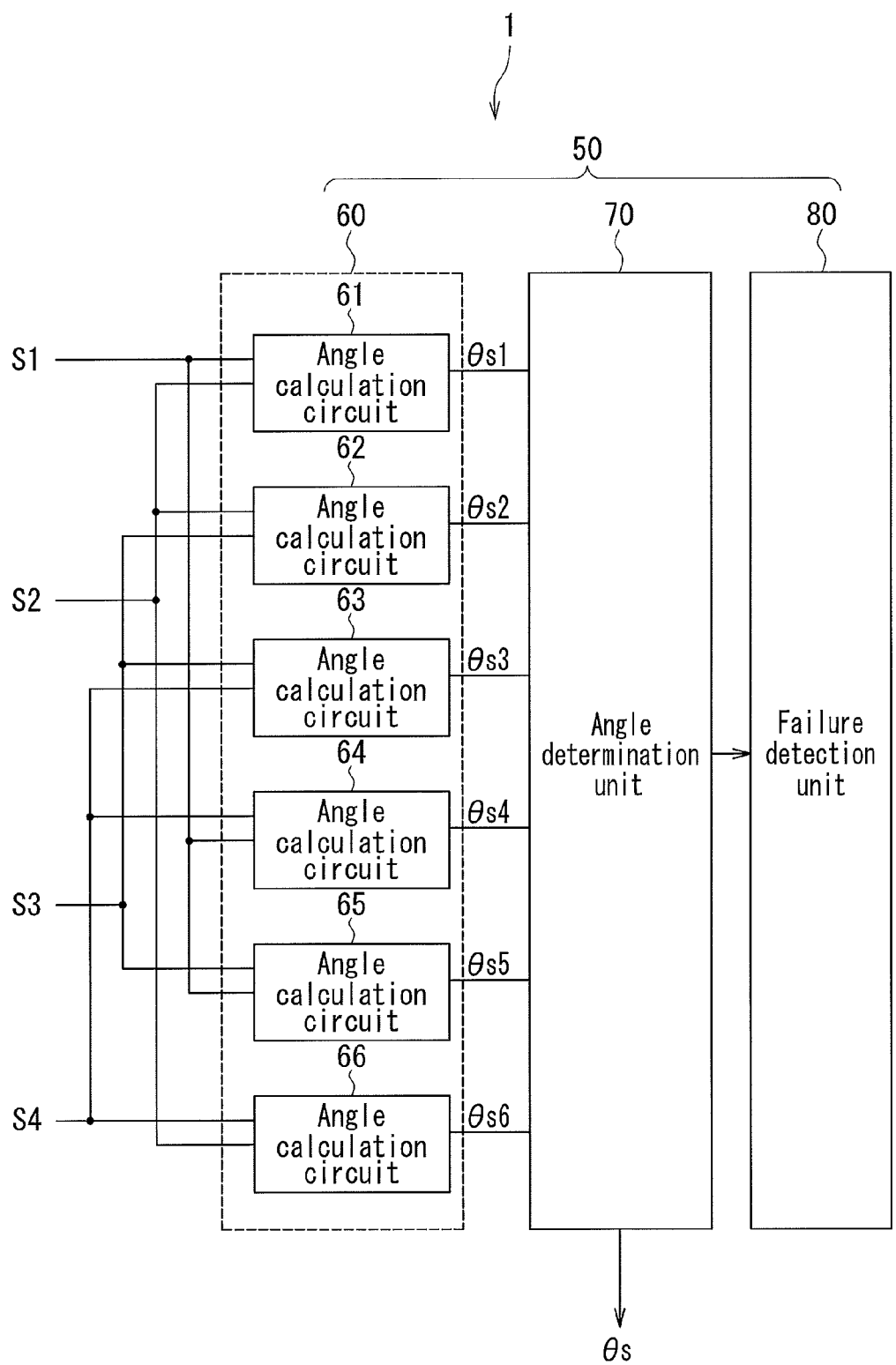
FIG. 4 is a circuit diagram illustrating a computing unit of the rotating field sensor according to the first embodiment of the invention.

The rotating field sensor 1 of the practical example further includes a computing unit 50. FIG. 4 is a circuit diagram illustrating the computing unit 50 of the rotating field sensor 1. The computing unit 50 performs a computation for determining the angle detection value θs to be output from the rotating field sensor 1 by using the first to fourth output signals S1 to S4 of the first to fourth detection circuits 10, 20, 30 and 40. The angle detection value θs has a correspondence relationship with the angle θ.

In the computing unit 50, four first detection circuit groups are defined, each of the four first detection circuit groups consisting of three detection circuits selected from the first to fourth detection circuits 10, 20, 30 and 40. Specifically, the following first detection circuit groups are defined: a first detection circuit group consisting of the detection circuits 10, 20 and 30; a first detection circuit group consisting of the detection circuits 20, 30 and 40; a first detection circuit group consisting of the detection circuits 30, 40 and 10; and a first detection circuit group consisting of the detection circuits 40, 10 and 20. In the following description, the first detection circuit groups of the practical example will each be represented by a plurality of parenthesized numerals indicating a plurality of detection circuits included in the group. For example, the first detection circuit group consisting of the detection circuits 10, 20 and 30 will be represented by (10, 20, 30).

In the computing unit 50, further, three second detection circuit groups are defined in each of the four first detection circuit groups (10, 20, 30), (20, 30, 40), (30, 40, 10) and (40, 10, 20). Each of the three second detection circuit groups consists of two detection circuits selected from the three detection circuits constituting a corresponding one of the four first detection circuit groups. Table 1 shows the second detection circuit groups defined in the computing unit 50. The second detection circuit groups of the practical example will be represented in a similar manner to that of the first detection circuit groups of the practical example.

TABLE 1

| First detection circuit groups | Second detection circuit groups |
| --- | --- |
| (10, 20, 30) | (10, 20), (20, 30), (30, 10) |
| (20, 30, 40) | (20, 30), (30, 40), (40, 20) |
| (30, 40, 10) | (30, 40), (40, 10), (10, 30) |
| (40, 10, 20) | (40, 10), (10, 20), (20, 40) |

In Table 1, both (30, 10) and (10, 30) represent the second detection circuit group consisting of the first detection circuit 10 and the third detection circuit 30. Both (40, 20) and (20, 40) represent the second detection circuit group consisting of the second detection circuit 20 and the fourth detection circuit 40. In the following description, the expression (30, 10) will be consistently used for (30, 10) and (10, 30), and the expression (40, 20) will be consistently used for (40, 20) and (20, 40).

As shown in FIG. 4, the computing unit 50 includes an angle calculation unit 60 and an angle determination unit 70. The angle calculation unit 60 calculates an angle value for each of all the second detection circuit groups (10, 20), (20, 30), (30, 40), (40, 10), (30, 10) and (40, 20) on the basis of two output signals of the two detection circuits constituting the second detection circuit group. The angle value has a correspondence relationship with the angle θ. For a second detection circuit group that belongs to a plurality of first detection circuit groups, the angle value calculation is performed only once. For example, as shown in Table 1, the second detection circuit group (10, 20) belongs to both of the first detection circuit groups (10, 20, 30) and (40, 10, 20). In such a case, the angle calculation unit 60 calculates the angle value for the second detection circuit group (10, 20) only once.

The angle determination unit 70 extracts one or more normal first detection circuit groups from the four first detection circuit groups (10, 20, 30), (20, 30, 40), (30, 40, 10) and (40, 10, 20). Each of the one or more normal first detection circuit groups is such a first detection circuit group that all three angle values corresponding to the three second detection circuit groups belonging thereto fall within an angle range of a predetermined breadth. The angle determination unit 70 then determines the angle detection value $\theta s$ on the basis of at least one of all angle values corresponding to all second detection circuit groups belonging to the one or more normal first detection circuit groups.

The computing unit 50 further includes a failure detection unit 80. In the case of a failure of one of the first to fourth detection circuits 10, 20, 30 and 40, the failure detection unit 80 identifies the failed detection circuit. The angle determination unit 70 and the failure detection unit 80 can be implemented by an application-specific integrated circuit (ASIC) or a microcomputer, for example. In the case of a microcomputer, the angle determination unit 70 and the failure detection unit 80 are implemented by software, not by physically separate elements.

Figure 5:
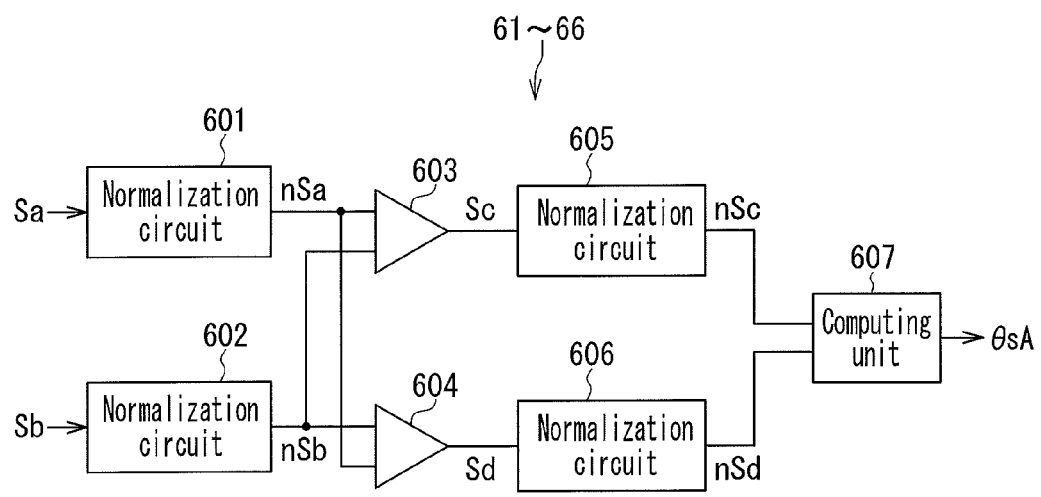
FIG. 5 is a block diagram illustrating the configuration of angle calculation circuits of the angle calculation unit shown in FIG. 4.

The configuration of the angle calculation unit 60 will now be described in detail with reference to FIG. 4 and FIG. 5. FIG. 5 is a block diagram illustrating the configuration of angle calculation circuits of the angle calculation unit 60. As shown in FIG. 4, the angle calculation unit 60 includes a first angle calculation circuit 61, a second angle calculation circuit 62, a third angle calculation circuit 63, a fourth angle calculation circuit 64, a fifth angle calculation circuit 65, and a sixth angle calculation circuit 66. Each of the first to sixth angle calculation circuits 61 to 66 has two inputs and an output.

The two inputs of the first angle calculation circuit 61 are connected to the output of the difference detector 15 of the first detection circuit 10 and the output of the difference detector 25 of the second detection circuit 20. The first angle calculation circuit 61 calculates an angle value $\theta s1$ having a correspondence relationship with the angle $\theta$ for the second detection circuit group (10, 20) on the basis of the first and second output signals S1 and S2 of the first and second detection circuits 10 and 20.

The two inputs of the second angle calculation circuit 62 are connected to the output of the difference detector 25 of the second detection circuit 20 and the output of the difference detector 35 of the third detection circuit 30. The second angle calculation circuit 62 calculates an angle value $\theta s2$ having a correspondence relationship with the angle $\theta$ for the second detection circuit group (20, 30) on the basis of the second and third output signals S2 and S3 of the second and third detection circuits 20 and 30.

The two inputs of the third angle calculation circuit 63 are connected to the output of the difference detector 35 of the third detection circuit 30 and the output of the difference detector 45 of the fourth detection circuit 40. The third angle calculation circuit 63 calculates an angle value $\theta s3$ having a correspondence relationship with the angle $\theta$ for the second detection circuit group (30, 40) on the basis of the third and fourth output signals S3 and S4 of the third and fourth detection circuits 30 and 40.

The two inputs of the fourth angle calculation circuit 64 are connected to the output of the difference detector 45 of the fourth detection circuit 40 and the output of the difference detector 15 of the first detection circuit 10. The fourth angle calculation circuit 64 calculates an angle value $\theta s4$ having a correspondence relationship with the angle $\theta$ for the second detection circuit group (40, 10) on the basis of the fourth and first output signals S4 and S1 of the fourth and first detection circuits 40 and 10.

The two inputs of the fifth angle calculation circuit 65 are connected to the output of the difference detector 35 of the third detection circuit 30 and the output of the difference detector 15 of the first detection circuit 10. The fifth angle calculation circuit 65 calculates an angle value $\theta s5$ having a correspondence relationship with the angle $\theta$ for the second detection circuit group (30, 10) on the basis of the third and first output signals S3 and S1 of the third and first detection circuits 30 and 10.

The two inputs of the sixth angle calculation circuit 66 are connected to the output of the difference detector 45 of the fourth detection circuit 40 and the output of the difference detector 25 of the second detection circuit 20. The sixth angle calculation circuit 66 calculates an angle value $\theta s6$ having a correspondence relationship with the angle $\theta$ for the second detection circuit group (40, 20) on the basis of the fourth and second output signals S4 and S2 of the fourth and second detection circuits 40 and 20.

The first to sixth angle calculation circuits 61 to 66 have the same configuration. As shown in FIG. 5, each of the first to sixth angle calculation circuits 61 to 66 includes normalization circuits 601, 602, 605 and 606, an adder circuit 603, a subtractor circuit 604, and a computing unit 607. Each of the normalization circuits 601, 602, 605 and 606 has an input and an output. Each of the adder circuit 603, the subtractor circuit 604 and the computing unit 607 has two inputs and an output.

The two inputs of each of the first to sixth angle calculation circuits 61 to 66 are formed by the respective inputs of the normalization circuits 601 and 602. Thus, the respective inputs of the normalization circuits 601 and 602 of the first angle calculation circuit 61 are connected to the respective outputs of the difference detectors 15 and 25. The respective inputs of the normalization circuits 601 and 602 of the second angle calculation circuit 62 are connected to the respective outputs of the difference detectors 25 and 35. The respective inputs of the normalization circuits 601 and 602 of the third angle calculation circuit 63 are connected to the respective outputs of the difference detectors 35 and 45. The respective inputs of the normalization circuits 601 and 602 of the fourth angle calculation circuit 64 are connected to the respective outputs of the difference detectors 45 and 15. The respective inputs of the normalization circuits 601 and 602 of the fifth angle calculation circuit 65 are connected to the respective outputs of the difference detectors 35 and 15. The respective inputs of the normalization circuits 601 and 602 of the sixth angle calculation circuit 66 are connected to the respective outputs of the difference detectors 45 and 25.

The two inputs of the adder circuit 603 are connected to the respective outputs of the normalization circuits 601 and 602. The two inputs of the subtractor circuit 604 are also connected to the respective outputs of the normalization circuits 601 and 602. The input of the normalization circuit 605 is connected to the output of the adder circuit 603. The input of the normalization circuit 606 is connected to the output of the subtractor circuit 604. The two inputs of the computing unit 607 are connected to the respective outputs of the normalization circuits 605 and 606.

The outputs of the first to sixth angle calculation circuits 61 to 66 are formed by the outputs of the respective computing units 607. As shown in FIG. 4, the angle determination unit 70 has six inputs, and an output for outputting the angle detection value $\theta s$. The six inputs of the angle determination unit 70 are connected to the respective outputs of the first to sixth angle calculation circuits 61 to 66 (the outputs of the respective computing units 607).

The operation of the angle calculation circuits of FIG. 5 will now be described. Here, two signals input to an angle calculation circuit are denoted by Sa and Sb, and the angle value output from the angle calculation circuit is denoted by θsA. The signal Sa is input to the normalization circuit 601. The signal Sb is input to the normalization circuit 602. The normalization circuit 601 outputs a signal nSa obtained by normalizing the signal Sa to the adder circuit 603 and the subtractor circuit 604. The normalization circuit 602 outputs a signal nSb obtained by normalizing the signal Sb to the adder circuit 603 and the subtractor circuit 604. The normalization circuits 601 and 602 normalize the signals Sa and Sb, respectively, in such a manner that the signals Sa and Sb both have a maximum value of 1 and a minimum value of −1.

The adder circuit 603 generates an addition signal Sc by a computation that includes determining the sum of the signals nSa and nSb. The subtractor circuit 604 generates a subtraction signal Sd by a computation that includes determining the difference between the signals nSa and nSb. The phrase "a computation that includes determining the sum of (the difference between) the signals nSa and nSb" means that the computation can include not only determining the sum of the signals nSa and nSb or the difference between the signals nSa and nSb but also thereafter multiplying the sum or difference by a predetermined coefficient or adding/subtracting a predetermined value to/from the sum or difference for the purpose of normalization or the like.

The normalization circuit 605 outputs a signal nSc obtained by normalizing the addition signal Sc to the computing unit 607. The normalization circuit 606 outputs a signal nSd obtained by normalizing the subtraction signal Sd to the computing unit 607. The normalization circuits 605 and 606 normalize the addition signal Sc and the subtraction signal Sd, respectively, in such a manner that the addition signal Sc and the subtraction signal Sd both have a maximum value of 1 and a minimum value of −1. The computing unit 607 calculates the angle value θsA on the basis of the signals nSc and nSd. In the practical example, the angle value θsA corresponds to one of the angle values θs1 to θs6. The method of calculation of the angle value θsA (the method of calculation of the angle values θs1 to θs6) by the computing unit 607 will be described later.

Figure 7:
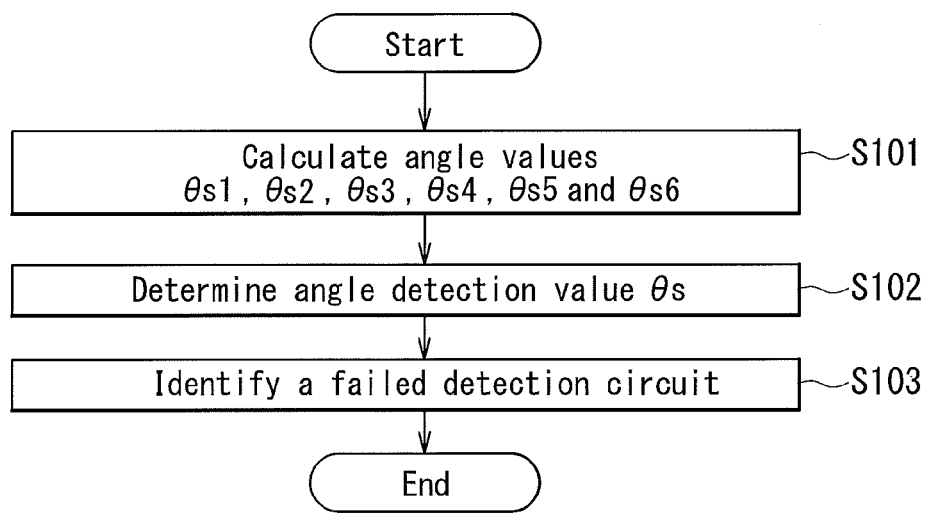
FIG. 7 is a flowchart illustrating an angle determination method according to the first embodiment of the invention.

The angle determination method of the practical example will now be described. The angle determination method of the practical example uses the rotating field sensor 1 of the practical example. The angle determination method of the practical example satisfies the foregoing requirements 1 to 8. According to the angle determination method of the practical example, as has been described in relation to the computing unit 50, the first detection circuit groups and the second detection circuit groups shown in Table 1 are defined in advance. FIG. 7 is a flowchart illustrating the angle determination method of the practical example. The angle determination method of the practical example includes a first step S101, a second step S102, and a third step S103 described below.

In the first step S101, the angle values θs1, θs2, θs3, θs4, θs5 and θs6 are calculated for all the second detection circuit groups (10, 20), (20, 30), (30, 40), (40, 10), (30, 10), and (40, 20), respectively, each on the basis of the two output signals of the two detection circuits constituting the second detection circuit group. The first step S101 is performed by the angle calculation unit 60.

In the second step S102, one or more normal first detection circuit groups are extracted from the four first detection circuit groups (10, 20, 30), (20, 30, 40), (30, 40, 10) and (40, 10, 20). Each of the one or more normal first detection circuit groups is such a first detection circuit group that all three angle values corresponding to the three second detection circuit groups belonging thereto fall within an angle range of a predetermined breadth. The angle detection value θs is then determined on the basis of at least one of all angle values corresponding to all second detection circuit groups belonging to the one or more normal first detection circuit groups. The second step S102 is performed by the angle determination unit 70.

The third step S103 is the step of identifying, in the case of a failure of one of the N detection circuits, the failed detection circuit. In the third step S103, first, an angle value range of a predetermined breadth in which all angle values corresponding to all second detection circuit groups belonging to the one or more normal first detection circuit groups are included is set as a normal angle value range. Then, a plurality of abnormal first detection circuit groups other than the one or more normal first detection circuit groups are extracted from the four first detection circuit groups (10, 20, 30), (20, 30, 40), (30, 40, 10) and (40, 10, 20). Then, all angle values corresponding to all second detection circuit groups belonging to the plurality of abnormal first detection circuit groups are classified into normal angle values falling within the normal angle value range and abnormal angle values falling outside the normal angle value range. Then, a detection circuit that belongs to all second detection circuit groups corresponding to all the abnormal angle values and does not belong to any of second detection circuit groups corresponding to all the normal angle values is identified as the failed detection circuit. The third step S103 is performed by the failure detection unit 80.

The third step S103 may be performed only if the second step S102 failed to extract all the first detection circuit groups as normal first detection circuit groups. In other words, the third step S103 may be performed only if one of the first to fourth detection circuits 10 to 40 is estimated to be in failure.

How the angle values θs1 to θs6 are calculated at the angle calculation unit 60 in the first step S101 will now be described with reference to FIG. 5. In the following description, suppose that none of the detection circuits 10, 20, 30 and 40 fails First, the method of calculation of the angle value θs1 by the first angle calculation circuit 61 will be described. The foregoing description of the operation of the angle calculation circuits serves as the description of the method of calculation of the angle value θs1 if the signals Sa and Sb are replaced with the first and second output signals S1 and S2, respectively. The absolute value of the phase difference between the first output signal S1 and the second output signal S2 is 45° (π/4). Thus, the signal nSa obtained by normalizing the signal Sa (the first output signal S1) will be expressed as cos θ, and the signal nSb obtained by normalizing the signal Sb (the second output signal S2) will be expressed as cos(θ−π/4). In this case, the signal nSc obtained by normalizing the addition signal Sc is cos(θ−π/8), and the signal nSd obtained by normalizing the subtraction signal Sd is sin(θ−π/8).

Here, θ−π/8 will be denoted by θp1. Then, cos(θ−π/8) and sin(θ−π/8) can be expressed as cos θp1 and sin θp1, respectively. The relationship that θs1=θp1+π/8 holds between θs1 and θp1. The computing unit 607 of the first angle calculation circuit 61 calculates θs1 by Equation (1) below. Note that "a tan" represents arctangent.

$$\theta s1 = \theta p1 + \pi/8 \quad (1)$$
$$= \operatorname{atan}(\sin\theta p1/\cos\theta p1) + \pi/8$$

The term "a tan(sin θp1/cos θp1)" of Equation (1) represents the arctangent calculation for determining θp1. For θp1 in the range of 0° to less than 360°, there are two solutions of θp1 in Equation (1) with a difference of 180° in value. Which of the two solutions of θp1 in Equation (1) is the true value of θp1 can be determined from the combination of positive and negative signs on cos θp1 and sin θp1, i.e., positive and negative sings on the signals nSc and nSd. More specifically, if the signal nSc is positive in value, θp1 is between 0° (inclusive) and 90° (exclusive), and between 270° (exclusive) and 360° (inclusive). If the signal nSc is negative in value, θp1 is greater than 90° and smaller than 270°. If the signal nSd is positive in value, θp1 is greater than 0° and smaller than 180°. If the signal nSd is negative in value, θp1 is greater than 180° and smaller than 360°. On the basis of the foregoing determination from the combination of positive and negative signs on the signals nSc and nSd, the computing unit 607 determines θp1 within the range of 0° to less than 360°.

Next, the method of calculation of the angle value θs2 by the second angle calculation circuit 62 will be described. The foregoing description of the operation of the angle calculation circuits serves as the description of the method of calculation of the angle value θs2 if the signals Sa and Sb are replaced with the second and third output signals S2 and S3, respectively. Here, the signal nSa obtained by normalizing the signal Sa (the second output signal S2) will be expressed as cos(θ−π/4). The absolute value of the phase difference between the first output signal S1 and the third output signal S3 is 90° (π/2). Thus, the signal nSb obtained by normalizing the signal Sb (the third output signal S3) will be expressed as cos(θ−π/2). In this case, the signal nSc obtained by normalizing the addition signal Sc is cos(θ−3π/8), and the signal nSd obtained by normalizing the subtraction signal Sd is sin(θ−3π/8).

Here, θ−3π/8 will be denoted by θp2. Then, cos(θ−3π/8) and sin(θ−3π/8) can be expressed as cos θp2 and sin θp2, respectively. The relationship that θs2=θp2+3π/8 holds between θs2 and θp2. The computing unit 607 of the second angle calculation circuit 62 calculates θs2 by Equation (2) below.

$$\theta s2 = \theta p2 + 3\pi/8 \quad (2)$$
$$= \operatorname{atan}(\sin\theta p2/\cos\theta p2) + 3\pi/8$$

The term "a tan(sin θp2/cos θp2)" of Equation (2) represents the arctangent calculation for determining θp2. On the basis of the foregoing determination from the combination of positive and negative signs on the signals nSc and nSd like the case of determining θp1, the computing unit 607 determines θp2 within the range of 0° to less than 360°.

Next, the method of calculation of the angle value θs3 by the third angle calculation circuit 63 will be described. The foregoing description of the operation of the angle calculation circuits serves as the description of the method of calculation of the angle value θs3 if the signals Sa and Sb are replaced with the third and fourth output signals S3 and S4, respectively. Here, the signal nSa obtained by normalizing the signal Sa (the third output signal S3) will be expressed as cos(θ−π/2). The absolute value of the phase difference between the first output signal S1 and the fourth output signal S4 is 135° (3π/4). Thus, the signal nSb obtained by normalizing the signal Sb (the fourth output signal S4) will be expressed as cos(θ−3π/4). In this case, the signal nSc obtained by normalizing the addition signal Sc is cos(θ−5π/8), and the signal nSd obtained by normalizing the subtraction signal Sd is sin(θ−5π/8).

Here, θ−5π/8 will be denoted by θp3. Then, cos(θ−5π/8) and sin(θ-5π/8) can be expressed as cos θp3 and sin θp3, respectively. The relationship that θs3=θp3+5π/8 holds between θs3 and θp3. The computing unit 607 of the third angle calculation circuit 63 calculates θs3 by Equation (3) below.

$$\theta s3 = \theta p3 + 5\pi/8 \quad (3)$$
$$= \operatorname{atan}(\sin\theta p3/\cos\theta p3) + 5\pi/8$$

The term "a tan(sin θp3/cos θp3)" of Equation (3) represents the arctangent calculation for determining θp3. On the basis of the foregoing determination from the combination of positive and negative signs on the signals nSc and nSd like the case of determining θp1, the computing unit 607 determines θp3 within the range of 0° to less than 360°.

Next, the method of calculation of the angle value θs4 by the fourth angle calculation circuit 64 will be described. The foregoing description of method of calculation of the angle value θs4 if the signals Sa and Sb are replaced with the fourth and first output signals S4 and S1, respectively. Here, the signal nSa obtained by normalizing the signal Sa (the fourth output signal S4) will be expressed as cos(θ−3π/4), and the signal nSb obtained by normalizing the signal Sb (the first output signal S1) will be expressed as cos θ. In this case, the signal nSc obtained by normalizing the addition signal Sc is −sin(θ−7π/8), and the signal nSd obtained by normalizing the subtraction signal Sd is −cos(θ−7π/8).

Here, θ−7π/8 will be denoted by θp4. Then, −sin(θ−7π/8) and −cos(θ−7π/8) can be expressed as −sin θp4 and −cos θp4, respectively. The relationship that θs4=θp4+7π/8 holds between θs4 and θp4. The computing unit 607 of the fourth angle calculation circuit 64 calculates θs4 by Equation (4) below.

$$\theta s4 = \theta p4 + 7\pi/8 \quad (4)$$
$$= \operatorname{atan}(\sin\theta p4/\cos\theta p4) + 7\pi/8$$

The term "a tan(sin θp4/cos θp4)" of Equation (4) represents the arctangent calculation for determining θp4. If the signal nSc (−sin θp4) is positive in value, θp4 is greater than 180° and smaller than 360°. If the signal nSc is negative in value, θp4 is greater than 0° and smaller than 180°. If the signal nSd (−cos θp4) is positive in value, θp4 is greater than 90° and smaller than 270°. If the signal nSd is negative in value, θp4 is between 0° (inclusive) and 90° (exclusive), and between 270° (exclusive) and 360° (inclusive). On the basis of the foregoing determination from the combination of positive and negative signs on the signals nSc and nSd, the computing unit 607 determines θp4 within the range of 0° to less than 360°.

Next, the method of calculation of the angle value θs5 by the fifth angle calculation circuit 65 will be described. The foregoing description of the operation of the angle calculation circuits serves as the description of the method of calculation of the angle value θs5 if the signals Sa and Sb are replaced with the third and first output signals S3 and S1, respectively. Here, the signal nSa obtained by normalizing the signal Sa (the third output signal S3) will be expressed as $\cos(\theta-\pi/2)$, and the signal nSb obtained by normalizing the signal Sb (the first output signal S1) will be expressed as $\cos\theta$. In this case, the signal nSc obtained by normalizing the addition signal Sc is $\cos(-\theta+\pi/4)$, and the signal nSd obtained by normalizing the subtraction signal Sd is $\sin(-\theta+\pi/4)$.

Here, $-\theta+\pi/4$ will be denoted by θp5. Then, $\cos(-\theta+\pi/4)$ and $\sin(-\theta+\pi/4)$ can be expressed as $\cos\theta p5$ and $\sin\theta p5$, respectively. The relationship that $\theta s5=-\theta p5+\pi/4$ holds between θs5 and θp5. The computing unit 607 of the fifth angle calculation circuit 65 calculates θs5 by Equation (5) below.

$$\theta s5 = -\theta p5 + \pi/4 \qquad (5)$$
$$= -\mathrm{atan}(\sin\theta p5/\cos\theta p5) + \pi/4$$

The term "a tan(sin θp5/cos θp5)" of Equation (5) represents the arctangent calculation for determining θp5. On the basis of the foregoing determination from the combination of positive and negative signs on the signals nSc and nSd like the case of determining θp1, the computing unit 607 determines θp5 within the range of 0° to less than 360°.

Next, the method of calculation of the angle value θs6 by the sixth angle calculation circuit 66 will be described. The foregoing description of the operation of the angle calculation circuits serves as the description of the method of calculation of the angle value θs6 if the signals Sa and Sb are replaced with the fourth and second output signals S4 and S2, respectively. Here, the signal nSa obtained by normalizing the signal Sa (the fourth output signal S4) will be expressed as $\cos(\theta-3\pi/4)$, and the signal nSb obtained by normalizing the signal Sb (the second output signal S2) will be expressed as $\cos(\theta-\pi/4)$. In this case, the signal nSc obtained by normalizing the addition signal Sc is $\cos(-\theta+\pi/2)$, and the signal nSd obtained by normalizing the subtraction signal Sd is $\sin(-\theta+\pi/2)$.

Here, $-\theta+\pi/2$ will be denoted by θp6. Then, $\cos(-\theta+\pi/2)$ and $\sin(-\theta+\pi/2)$ can be expressed as $\cos\theta p6$ and $\sin\theta p6$, respectively. The relationship that $\theta s6=-\theta p6+\pi/2$ holds between θs6 and θp6. The computing unit 607 of the sixth angle calculation circuit 66 calculates θs6 by Equation (6) below.

$$\theta s6 = -\theta p6 + \pi/2 \qquad (6)$$
$$= -\mathrm{atan}(\sin\theta p6/\cos\theta p6) + \pi/2$$

The term "a tan(sin θp6/cos θp6)" of Equation (6) represents the arctangent calculation for determining θp6. On the basis of the foregoing determination from the combination of positive and negative signs on the signals nSc and nSd like the case of determining θp1, the computing unit 607 determines θp6 within the range of 0° to less than 360°.

It is preferred that each of θs1 to θs6 fall within the range of 0° to less than 360°. However, since the computing units 607 determines θp1 to θp6 within the range of 0° to less than 360° as described above, θs1 to θs6 calculated by Equations (1) to (6) can sometimes be less than 0°, or be 360° or greater. To cope with this, after the calculation of the angle values θs1 to θs6 by Equations (1) to (6), one(s) less than 0° or not less than 360° may be subjected to a computation for transformation into a value or values within the range of 0° to less than 360°. Specifically, an angle value of less than 0° is subjected to a computation to add 360° to the angle value. On the other hand, an angle value of 360° or greater is subjected to a computation to subtract 360° from the angle value. Such computations may be performed by the computing unit 607 or by the angle determination unit 70. In the following description, assume that each of θs1 to θs6 falls within the range of 0° to less than 360°.

The characteristics of the first to fourth output signals S1 to S4 and the angle values θs1 to θs6 will now be described. Ideally, as mentioned previously, the waveforms of the output signals S1 to S4 should trace a sinusoidal curve. Assume here that each of the first to fourth output signals S1 to S4 contains an ideal component which varies periodically in such a manner as to trace an ideal sinusoidal curve, and an error component other than the ideal component. The error components of the first to fourth output signals S1 to S4 can occur even if none of the first to fourth detection circuits 10, 20, 30 and 40 fails.

Figure 8:
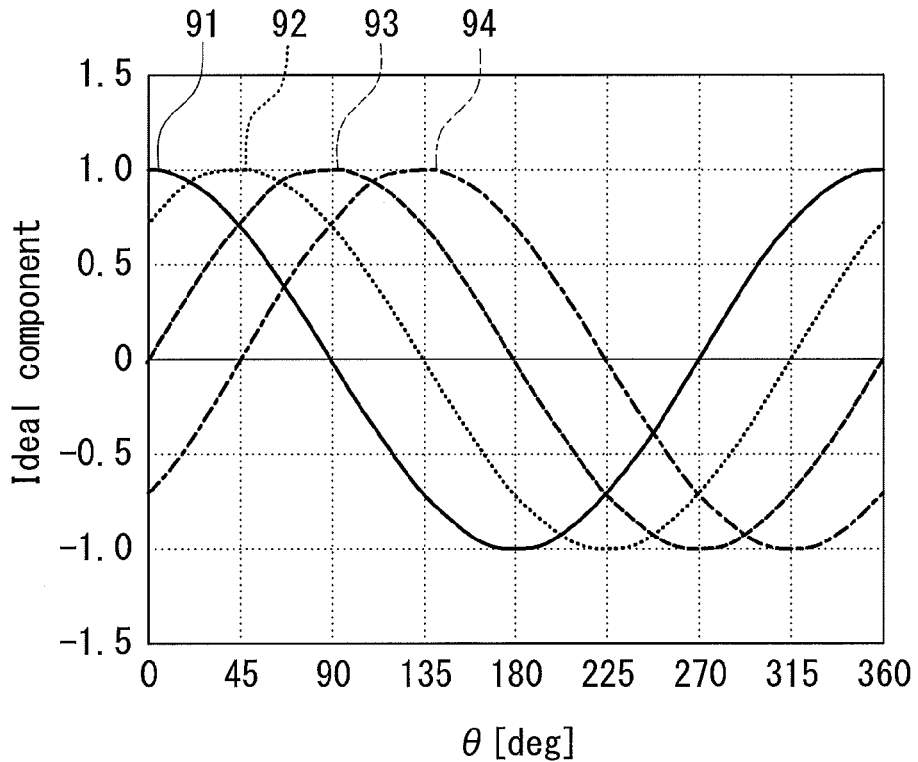
FIG. 8 is a waveform diagram illustrating an example of waveforms of ideal components contained in first to fourth output signals in the first embodiment of the invention.

FIG. 8 is a waveform diagram illustrating an example of waveforms of the ideal components of the first to fourth output signals S1 to S4. In FIG. 8, the horizontal axis represents angle θ, and the vertical axis represents the magnitude of the ideal components. The waveforms labeled 91, 92, 93 and 94 indicate the ideal components of the output signals S1, S2, S3 and S4, respectively. In FIG. 8, the ideal components have been normalized to have a maximum value of 1 and a minimum value of −1.

When the first to fourth output signals S1 to S4 contain their respective error components, the angle values θs1 to θs6 calculated on the basis of the first to fourth output signals S1 to S4 contain their respective angle errors. The angle errors of the angle values θs1 to θs6 are errors with respect to theoretical values of the angle values θs1 to θs6 that are expected when the direction DM of the rotating magnetic field MF rotates ideally.

Now, the principle for extracting one or more normal first detection circuit groups by the angle determination unit 70 in the second step S102 and the principle for extracting a plurality of abnormal first detection circuit groups by the failure detection unit 80 in the third step S103 will be described. If the first to fourth detection circuits 10, 20, 30 and 40 are all normal, the angle values θs1 to θs6 are identical with or very close to each other, and the angle errors of the angle values θs1 to θs6 are also identical with or very close to each other.

If one of the first to fourth detection circuits 10, 20, 30 and 40 fails, the output signal of the failed detection circuit becomes different from that when the detection circuit is normal. As a result, among the six angle values θs1 to θs6, three angle values corresponding to three second detection circuit groups that include the failed detection circuit become incorrect angle values, whereas the remaining three angle values are correct angle values. The three correct angle values are identical with or very close to each other, whereas the three incorrect angle values are distinctly different from the three correct angle values. Similarly, the angle errors of the three correct angle values are identical with or very close to each other, whereas the angle errors of the three incorrect angle values are distinctly different from those of the three correct angle values. In this regard, a concrete description will be given below by using an example in which the third detection circuit 30 fails.

If the third detection circuit 30 fails, the three angle values θs2, θs3 and θs5 calculated for the three second detection circuit groups (20, 30), (30, 40) and (30, 10) including the third detection circuit 30 become incorrect angle values, whereas the three angle values θs1, θs4 and θs6 calculated for the other three second detection circuit groups (10, 20), (40, 10) and (40, 20) not including the third detection circuit 30 are correct angle values. In other words, the angle values θs1, θs4 and θs6 are identical with or very close to each other, whereas the angle values θs2, θs3 and θs5 are distinctly different from each other and distinctly different from the angle values θs1, θs4 and θs6. Similarly, the angle errors of the angle values θs1, θs4 and θs6 are identical with or very close to each other, whereas the angle errors of the angle values θs2, θs3 and θs5 are distinctly different from each other and distinctly different from the angle errors of the angle values θs1, θs4 and θs6.

Figure 9:
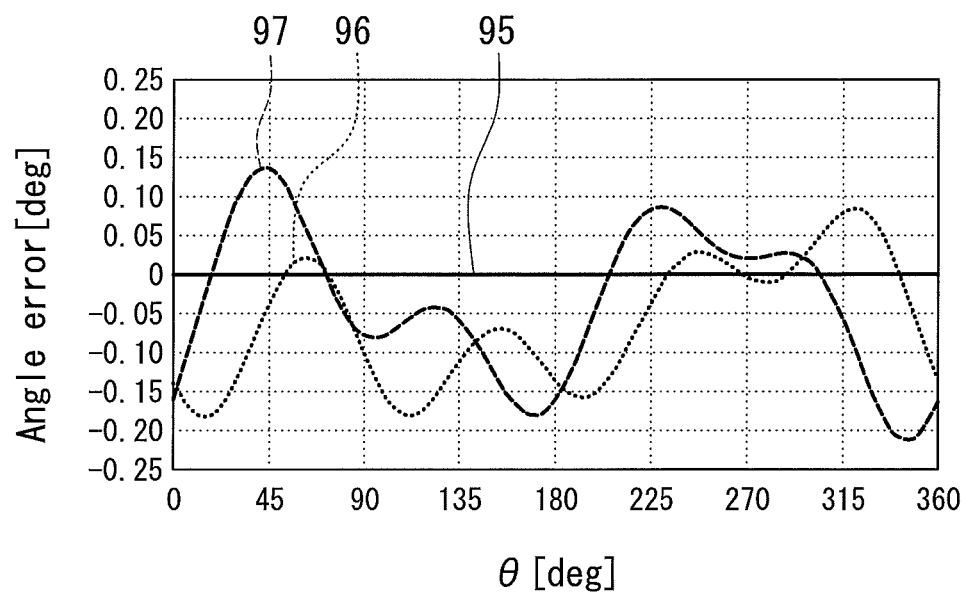
FIG. 9 is a waveform diagram illustrating an example of angle errors contained in angle values in the first embodiment of the invention.

FIG. 9 is a waveform diagram illustrating an example of the angle errors of the angle values θs1 and θs3 to θs6 when the third detection circuit 30 fails. In FIG. 9, the horizontal axis represents angle θ, and the vertical axis represents the magnitude of the angle errors. The waveform labeled 95 indicates the angle error of each of the angle values θs1, θs4 and θs6. The waveform labeled 96 indicates the angle error of the angle value θs3. The waveform labeled 97 indicates the angle error of the angle value θs5. In this example, the angle error of each of the angle values θs1, θs4 and θs6 remains at zero regardless of the angle θ. In contrast, the angle errors 96 and 97 of the angle values θs3 and θs5 are distinctly different from each other and distinctly different from the angle error 95 of each of the angle values θs1, θs4 and θs6. Although not illustrated, the angle error of the angle value θs2 is distinctly different from the angle errors 96 and 97 of the angle values θs3 and θs5, and also distinctly different from the angle error 95 of each of the angle values θs1, θs4 and θs6.

Two of the angle values θs2, θs3 and θs5 become identical with or very close to each other at certain timing. In the example shown in FIG. 9, the angle values θs3 and θs5 become identical with or very close to each other at the timing at which the waveforms of the angle errors 96 and 97 of the angle values θs3 and θs5 coincide with each other. Even at such timing, the angle errors 96 and 97 of the angle values θs3 and θs5 are distinctly different from the angle error 95 of each of the angle values θs1, θs4 and θs6, and therefore the angle values θs3 and θs5 are distinctly different from the angle values θs1, θs4 and θs6. Similarly, even if the angle value θs2 and the angle value θs3 or θs5 become identical with or very close to each other at certain timing, those angle values are distinctly different from the angle values θs1, θs4 and θs6.

According to the rotating field sensor 1 of the practical example and the angle determination method of the practical example, as described previously, there are defined four first detection circuit groups, and further, three second detection circuit groups are defined in each of the four first detection circuit groups. This is for the purpose of making a distinction between normal first detection circuit groups and abnormal first detection circuit groups by using the following characteristic. In a first detection circuit group to which no failed detection circuit belongs, all the three angle values corresponding to the three second detection circuit groups belonging thereto are correct angle values, and fall within an angle range of a predetermined breadth. In contrast, in a first detection circuit group to which a failed detection circuit belongs, the three angle values corresponding to the three second detection circuit groups belonging thereto include two incorrect angle values, which results in great variations in the three angle values. In other words, not all the three angle values fall within an angle range of a predetermined breadth. Even if the two incorrect angle values become identical with or very close to each other at certain timing, the two incorrect angle values are distinctly different from the remaining one angle value which is a correct angle value, and variations in the three angle values are therefore great. A first detection circuit group to which no failed detection circuit belongs is thus distinguishable because all the three angle values corresponding to the three second detection circuit groups belonging thereto fall within an angle range of a predetermined breadth. By using such a characteristic, the rotating field sensor 1 of the practical example and the angle determination method of the practical example extract one or more normal first detection circuit groups and a plurality of abnormal first detection circuit groups.

The angle range of a predetermined breadth will now be described. Initially, suppose that two angles θA and θB define an angle range within the range of 0° to less than 360°. The angle θB is greater than the angle θA. Next, θD1 and θD2 are defined as follows.

$$\theta D1 = \theta B - \theta A$$

$$\theta D2 = \theta A + 360° - \theta B$$

Next, an angle difference θD between θA and θB is defined as follows. If θD1 is smaller than or equal to θD2, the angle difference θD is θD1. If θD1 is greater than θD2, the angle difference θD is θD2.

Using the two angles θA and θB having an angle difference θD of a predetermined breadth therebetween, the angle range of a predetermined breadth is defined as (1) and (2) below.

(1) If θD1 is smaller than or equal to θD2, the range from θA to θB is the angle range of the predetermined breadth.

(2) If θD1 is greater than θD2, the range from θB to less than 360° and the range from 0° to θA are the angle range of the predetermined breadth.

Next, how to determine whether all the g (three in the practical example) angle values fall within the angle range of the predetermined breadth will be described. First, a difference between two angle values is defined like the foregoing angle difference θD. Specifically, letting the two angle values be θA and θB, the foregoing θD1 and θD2 are determined. If θD1 is smaller than or equal to θD2, θD1 is determined to be the difference between the two angle values. If θD1 is greater than θD2, θD2 is determined to be the difference between the two angle values.

All the g angle values falling within the angle range of the predetermined breadth means that a difference between any two of the g angle values is smaller than or equal to the predetermined breadth. Whether all the g angle values fall within the angle range of the predetermined breadth can thus be determined by determining whether a difference between any two of the g angle values is smaller than or equal to the predetermined breadth.

The predetermined breadth is selected so that all g angle values corresponding to g second detection circuit groups belonging to a first detection circuit group that is normal even in consideration of variations of the angle values not attributable to a failure of a detection circuit fall within the angle range of the predetermined breadth, and not all g angle values corresponding to g second detection circuit groups belonging to abnormal first detection circuit groups fall within the angle range of the predetermined breadth. For example, the predetermined breadth is 0.02°.

The angle determination unit 70 extracts one or more normal first detection circuit groups from the G first detection circuit groups by using the method described above. The failure detection unit 80 extracts from the G first detection circuit groups a plurality of abnormal first detection circuit groups other than the one or more normal first detection circuit groups extracted by the angle determination unit 70. For example, suppose that the third detection circuit 30 fails. In such a case, the angle determination unit 70 extracts, as a normal first detection circuit group, the first detection circuit group (40, 10, 20) to which the third detection circuit 30 does not belong. The failure detection unit 80 extracts, as abnormal first detection circuit groups, the first detection circuit groups (10, 20, 30), (20, 30, 40) and (30, 40, 10) to which the third detection circuit 30 belongs.

If none of the detection circuits 10, 20, 30 and 40 fails, all the three angle values corresponding to the three second detection circuit groups belonging to each of the four first detection circuit groups fall within the angle range of the predetermined breadth. In such a case, the angle determination unit 70 extracts all the four first detection circuit groups as normal first detection circuit groups.

Even if one of the first to fourth detection circuits 10, 20, 30 and 40 fails, all the three angle values corresponding to the three second detection circuit groups belonging to each of the four first detection circuit groups can sometimes fall within the angle range of the predetermined breadth like when none of the detection circuits 10, 20, 30 and 40 fails. In such a case, the angle determination unit 70 extracts all the four first detection circuit groups as normal first detection circuit groups. Such a case is where all the angle values including incorrect angle values are identical with or very close to each other. In that case, the incorrect angle values may be safely regarded as corrected angle values.

The method for determining the angle detection value θs in the second step S102 will now be described. In the second step S102, the angle detection value θs is determined on the basis of at least one of all angle values corresponding to all second detection circuit groups belonging to the one or more normal first detection circuit groups extracted as described above. The angle determination unit 70 determines the angle detection value θs according to a predetermined rule. Examples of the predetermined rule include a rule that an average value of all the aforementioned angle values shall be the angle detection value θs, and a rule that with each angle value expressed as θsr (r is an integer between 1 and 6 inclusive), one of all the aforementioned angle values that has the smallest r shall be the angle detection value θs. If all the four first detection circuit groups are extracted as normal first detection circuit groups, the angle determination unit 70 may output an average value of θs1 to θs6 as the angle detection value θs, or output θs1 as the angle detection value θs, for example. If the first detection circuit group (40, 10, 20) is extracted as a normal first detection circuit group, the angle determination unit 70 may output an average value of θs1, θs4 and θs6 as the angle detection value θs, or output θs1 as the angle detection value θs. Suppose that an average value of a plurality of angle values expressed in values within the range of 0° to less than 360° is to be determined. In such a case, if the plurality of angle values include both of one or more angle values θX1 in the range of 0° to 90° and one or more angle values θX2 in the range of 270° to less than 360°, the average value of those plurality of angle values is determined by the following method as an exceptional measure. First, let θX3=θX2−360°. Then, an average value of the one or more θX1's and one or more θX3's is obtained as a provisional average value. If the provisional average value is 0° or greater, the provisional average value is determined to be the average value of the plurality of angle values. If the provisional average value indicates an angle of a negative value, the sum of the provisional average value and 360° is determined to be the average value of the plurality of angle values.

Next, the method for identifying a failed circuit in the third step S103 will be described. In the third step S103, first, an angle value range of a predetermined breadth in which all the angle values corresponding to all the second detection circuit groups belonging to the one or more normal first detection circuit groups extracted in the second step S102 is set as a normal angle value range. For example, the normal angle value range is defined to be the range of the aforementioned predetermined breadth (for example, 0.02°) at the center of which is an average value of all the angle values corresponding to all the second detection circuit groups belonging to the one or more normal first detection circuit groups extracted in the second step S102. Suppose that angle values are expressed in values within the range of 0° to less than 360°, the foregoing average value is represented by θC, and the foregoing predetermined breadth is represented by θW. In such a case, the normal angle value range is the range between θC−θW/2 and θC+θW/2 inclusive, with the following first and second exceptions. The first exception is the case where θC+θW/2 is 360° or greater. In such a case, the normal angle value range is defined to be from θC−θW/2 to less than 360°, and from 0° to θC+θW/2−360°. The second exception is the case where θC−θW/2 indicates an angle of a negative value. In such a case, the normal angle value range is defined to be from θC−θW/2+360° to less than 360°, and from 0° to θC+θW/2.

In the third step S103, next, a plurality of abnormal first detection circuit groups are extracted by the method described above. Next, all angle values corresponding to all second detection circuit groups belonging to the plurality of abnormal first detection circuit groups are classified into normal angle values falling within the normal angle value range and abnormal angle values falling outside the normal angle value range. Then, a detection circuit that belongs to all second detection circuit groups corresponding to all the abnormal angle values and does not belong to any of second detection circuit groups corresponding to all the normal angle values is identified as the failed detection circuit. For example, suppose that the angle determination unit 70 extracts one first detection circuit group (40, 10, 20) as a normal first detection circuit group, and the failure detection unit 80 extracts three first detection circuit groups (10, 20, 30), (20, 30, 40) and (30, 40, 10) as abnormal first detection circuit groups. In such a case, the failure detection unit 80 classifies the angle values θs1, θs4 and θs6 as normal angle values, and the angle values θs2, θs3 and θs5 as abnormal angle values. The failure detection unit 80 then identifies the detection circuit 30 which belongs to all the second detection circuit groups (20, 30), (30, 40) and (30, 10) corresponding to the angle values θs2, θs3 and θs5 and does not belong to any of the second detection circuit groups (10, 20), (40, 10) and (40, 20) corresponding to the angle values θs1, θs4 and θs6 as the failed detection circuit.

In the rotating field sensor 1 of the practical example and the angle determination method of the practical example described above, N is four, M is three, G is four, m is two, and g is three. However, the rotating field sensor 1 and the angle determination method according to the first embodiment need only satisfy the foregoing requirements 1 to 6 in order to be able to output a correct angle detection value θs even in the case of a failure of one of the detection circuits, or need only satisfy the foregoing requirements 1 to 8 in order to be able to further identify the failed detection circuit. The failure detection unit 80 and the third step S103 of the practical example may be omitted from the rotating field sensor 1 and the angle determination method according to the first embodiment if it is not necessary to identify the failed detection circuit.

As described above, the angle calculation unit calculates each of the plurality of angle values corresponding to all the second detection circuit groups on the basis of m output signals of the m detection circuits constituting a corresponding one of the second detection circuit groups. Now, a description will be given of an example of the method for calculating the plurality of angle values when m is three or greater. According to this method, a plurality of angle calculation circuits having the same configuration as the angle calculation circuits shown in FIG. 5 are prepared in correspondence to the plurality of second detection circuit groups. In each second detection circuit group, two subgroups each consisting of one or more and not more than (m−1) detection circuits are formed. Each of the m detection circuits is used to constitute at least one of the two subgroups. Each subgroup generates a subgroup signal. If a subgroup consists of only one detection circuit, the output signal of the detection circuit may be simply used as the subgroup signal of the subgroup. If a subgroup consists of a plurality of detection circuits, the subgroup signal of the subgroup is generated by a computation using the output signals of the plurality of detection circuits, such as a computation for determining the sum, difference, or the like. In such a manner, each second detection circuit group generates two subgroup signals. According to such a method, the two subgroup signals of each second detection circuit group are supplied to two inputs of the angle calculation circuit corresponding to the second detection circuit group. On the basis of the two subgroup signals supplied to the two inputs, the angle calculation circuit then calculates an angle value having a correspondence relationship with the angle θ, like the angle calculation circuits 61 to 66.

To accurately calculate the angle value, if m is two, the phase difference between the two output signals of the two detection circuits constituting each second detection circuit group preferably has an absolute value other than 0° and 180°, and somewhat away from each of 0° and 180°. Specifically, the aforementioned phase difference preferably has an absolute value in the range of 15° to 165°, more preferably 30° to 150°. In the example shown in FIG. 3, the phase difference between the output signals S1 and S2 of the detection circuits 10 and 20 constituting the second detection circuit group (10, 20), the phase difference between the output signals S2 and S3 of the detection circuits 20 and 30 constituting the second detection circuit group (20, 30), and the phase difference between the output signals S3 and S4 of the detection circuits 30 and 40 constituting the second detection circuit group (30, 40) each have an absolute value of 45°. The phase difference between the output signals S4 and S1 of the detection circuits 40 and 10 constituting the second detection circuit group (40, 10) has an absolute value of 135°. The phase difference between the output signals S3 and S1 of the detection circuits 30 and 10 constituting the second detection circuit group (30, 10), and the phase difference between the output signals S4 and S2 of the detection circuits 40 and 20 constituting the second detection circuit group (40, 20) each have an absolute value of 90°. All of these phase differences satisfy the aforementioned condition.

Similarly, if m is three or greater, the phase difference between the two subgroup signals of each second detection circuit group preferably has an absolute value in the range of 15° to 165°, more preferably 30° to 150°. In this case, the m detection circuits constituting a second detection circuit group may include such detection circuits that the phase difference between their output signals has an absolute value of 0° or 180°, as long as the two subgroup signals satisfy the aforementioned condition.

Now, the rotating field sensor 1 and the angle determination method according to the first embodiment will be described in a conceptual manner with a detailed description of the meanings of the foregoing requirements 1 to 8. In order that a correct angle detection value θs can be output even if one of the N detection circuits fails, the following requirements 1 to 6 need to be satisfied. Requirement 1 is that N be an integer not less than four. Requirement 2 is that M be an integer not less than three and not more than (N−1). Requirement 3 is that each of the N detection circuits belong to one or more and not more than (G−1) of the G first detection circuit groups. Requirement 4 is that m be an integer not less than two and not more than (M−1). Requirement 5 is that g be an integer not less than M/m and not more than $_MC_m$. Requirement 6 is that in each of the G first detection circuit groups, each of the M detection circuits belong to one or more and not more than (g−1) of the g second detection circuit groups.

In order that a correct angle detection value θs can be output and further a failed detection circuit can be identified in the case of a failure of one of the N detection circuits, the following requirements 7 and 8 need to be satisfied in addition to requirements 1 to 6. Requirement 7 is that g be greater than or equal to M. Requirement 8 is that in each of the G first detection circuit groups, each of the M detection circuits belong to m or more second detection circuit groups.

Requirement 7 narrows requirement 5. Requirements 5 and 7 can be combined into the following requirement 5A: g be an integer not less than M and not more than $_MC_m$. Requirement 8 narrows requirement 6. Requirements 6 and 8 can be combined into the following requirement 6A: in each of the G first detection circuit groups, each of the M detection circuits belong to m or more and not more than (g−1) of the g second detection circuit groups.

It can thus be said that in order to make it possible to output a correct angle detection value θs and further identify a failed detection circuit in the case of a failure of one of the N detection circuits, requirements 1 to 4, 5A, and 6A need to be satisfied.

The meaning of each requirement will be described below. Requirement 4 will be described first. In order to calculate an angle value on the basis of the output signals of a plurality of detection circuits, m needs to be an integer not less than two. Without forming a plurality of second detection circuit groups belonging to one first detection circuit group, it is not possible to determine whether all of a plurality of angle values that correspond to a plurality of second detection circuit groups belonging to one first detection circuit group fall within an angle range of a predetermined breadth. In order to form a plurality of second detection circuit groups belonging to one first detection circuit group, m needs to be (M−1) or smaller.

Next, requirement 2 will be described. Since m is an integer not less than two, M needs to be an integer not less than three in order to form a plurality of second detection circuit groups belonging to one first detection circuit group. Further, in order that there exists at least one first detection circuit group to which no failed detection circuit belongs in the case of a failure of one of the N detection circuits, M needs to be (N−1) or smaller.

Next, requirement 1 will be described. To allow M to satisfy requirement 2, N needs to be an integer not less than four.

Next, requirement 3 will be described. In order that there is no detection circuit that is unused for calculation of an angle value, each of the N detection circuits needs to belong to at least one of the G first detection circuit groups. Further, in order that there exists at least one first detection circuit group to which no failed detection circuit belongs in the case of a failure of one of the N detection circuits, each of the N detection circuits needs to belong to (G−1) or less of the G first detection circuit groups. Possible values of G are restricted by requirements 1 to 3. For example, if N is four and M is three, the only possible value of G is four. The maximum possible value of G is NCM. Note that NCM is the total number of combinations of M detection circuits selected from N detection circuits, and is expressed by the following equation.

$${}_NC_M = \{N \times (N-1) \times \ldots \times (N-M+1)\}/\{M \times (M-1) \times \ldots \times 1\}$$

Next, requirement 5 will be described. In order that each first detection circuit group includes no detection circuit that does not belong to any of the second detection circuit groups, g needs to be an integer not less than M/m. The g second detection circuit groups are formed not to include two or more second detection circuit groups that consist of the same combination of a plurality of detection circuits. Consequently, g is ${}_MC_m$ or smaller. Note that ${}_MC_m$ is the total number of combinations of m detection circuits selected from M detection circuits, and is expressed by the following equation.

$${}_MC_m = \{M \times (M-1) \times \ldots \times (M-m+1)\}/\{m \times (m-1) \times \ldots \times 1\}$$

Next, requirement 5A will be described. In order that a failed detection circuit can be identified in the case of a failure of one of the N detection circuits, one detection circuit that belongs to all second detection circuit groups corresponding to all abnormal angle values and does not belong to any of second detection circuit groups corresponding to all normal angle values needs to be identifiable. For that purpose, g needs to be an integer not less than M. If g is less than M, there can exist a plurality of detection circuits that cannot be determined to be normal when one of the N detection circuits fails. Note that g is ${}_MC_m$ or smaller, as with requirement 5.

Next, requirement 6 will be described. In order that each first detection circuit group includes no detection circuit that does not belong to any of the second detection circuit groups, each of the M detection circuits in each first detection circuit group needs to belong to at least one of the g second detection circuit groups. Further, in order that at least one normal angle value can be obtained in each of all the first detection circuit groups even if one of the detection circuits fails, each of the M detection circuits in each first detection circuit group needs to belong to (g−1) or less of the g second detection circuit groups.

Next, requirement 6A will be described. As described above, in order that a failed detection circuit can be identified in the case of a failure of one of the N detection circuits, one detection circuit that belongs to all second detection circuit groups corresponding to all abnormal angle values and does not belong to any of second detection circuit groups corresponding to all normal angle values needs to be identifiable. For that purpose, each of the M detection circuits in each first detection circuit group needs to belong to m or more second detection circuit groups. If each of the M detection circuits in each first detection circuit group belongs to less than m second detection circuit groups, there can exist a plurality of detection circuits that belong to all the second detection circuit groups corresponding to all the abnormal angle values and do not belong to any of the second detection circuit groups corresponding to all the normal angle values. Note that each of the M detection circuits in each first detection circuit group needs to belong to (g−1) or less of the g second detection circuit groups, as with requirement 6.

Next, possible values of M, G, m and g, and possible combinations of detection circuits in each of the first and second detection circuit groups will be described with reference to specific examples. In the following description, the N detection circuits will be denoted by respective integer numbers of 1 to N. First and second detection circuit groups will each be represented by a parenthesized plurality of numbers of a plurality of detection circuits included in that group. For example, first and second detection circuit groups each consisting of three detection circuits numbered 1, 2, and 3 are each represented by (1, 2, 3). A second detection circuit group consisting of two detection circuits numbered 1 and 2 is represented by (1, 2).

[If N is Four]

From requirement 1, the minimum value of N is four. First, the case where N is four will be considered. From requirements 2 to 4, if N is four, the only possible value of M is three, the only possible value of G is four, and the only possible value of m is two. In such a case, the only value of g that satisfies requirements 5 and 6 is three, and the only value of g that satisfies requirements 5A and 6A is also three.

To satisfy requirements 1 to 4, 5A, and 6A with N being four, M being three, G being four, m being two and g being three, possible combinations of detection circuits in each of the first and second detection circuit groups are as in Table 2 below.

TABLE 2

| First detection circuit group | Second detection circuit group |
|---|---|
| (1, 2, 3) | (1, 2), (2, 3), (3, 1) |
| (2, 3, 4) | (2, 3), (3, 4), (4, 2) |
| (3, 4, 1) | (3, 4), (4, 1), (1, 3) |
| (4, 1, 2) | (4, 1), (1, 2), (2, 4) |

The rotating field sensor 1 shown in FIG. 3 and FIG. 4 is configured according to the example of Table 2.

[If N is Five]

Next, the case where N is five will be considered. From requirement 2, if N is five, possible values of M are three and four.

[If N is Five and M is Three]

From requirements 3 and 4, if N is five and M is three, possible values of G are between three and ten inclusive. The only possible value of m is two. In such a case, the only value of g that satisfies requirements 5 and 6 is three, and the only value of g that satisfies requirements 5A and 6A is also three.

[If N is Five and M is Four]

From requirement 3, if N is five and M is four, the only possible value of G is five. In such a case, from requirement 4, possible values of m are two and three.

If N is five, M is four and m is two, the values of g that satisfy requirements 5 and 6 are between two and six inclusive, and the values of g that satisfy requirements 5A and 6A are between four and six inclusive.

If N is five, M is four and m is three, the only value of g that satisfies requirements 5 and 6 is four, and the only value of g that satisfies requirements 5A and 6A is also four.

To satisfy requirements 1 to 4, 5A, and 6A with N being five, M being four, G being five, m being three and g being four, possible combinations of detection circuits constituting each of the first and second detection circuit groups are as in Table 3 below.

TABLE 3

| First detection circuit group | Second detection circuit group |
| --- | --- |
| (1, 2, 3, 4) | (1, 2, 3), (2, 3, 4), (3, 4, 1), (4, 1, 2) |
| (2, 3, 4, 5) | (2, 3, 4), (3, 4, 5), (4, 5, 2), (5, 2, 3) |
| (3, 4, 5, 1) | (3, 4, 5), (4, 5, 1), (5, 1, 3), (1, 3, 4) |
| (4, 5, 1, 2) | (4, 5, 1), (5, 1, 2), (1, 2, 4), (2, 4, 5) |
| (5, 1, 2, 3) | (5, 1, 2), (1, 2, 3), (2, 3, 5), (3, 5, 1) |

As can be seen from the specific examples described above, possible values of M, G, m and g, and combinations of detection circuits constituting each of the first and second detection circuit groups vary depending on the value of N. If N is six or greater, the combinations of detection circuits constituting the second detection circuit groups differ greatly between when requirements 1 to 6 are satisfied and when requirements 1 to 4, 5A, and 6A are satisfied. In this regard, a description will be given below by taking a case where N is nine as an example.

[If N is Nine]

From requirement 2, if N is nine, possible values of M are three to eight. Six examples of second detection circuit groups when N is nine will be listed below as examples 1 to 6.

[If N is Nine and M is Six]

From requirement 3, if N is nine and M is six, possible values of G are between 3 and 84 inclusive. If G is three, one of the three first detection circuit groups to be formed is the first detection circuit group (1, 2, 3, 4, 5, 6). In this case, from requirement 4, possible values of m are between two and five inclusive. If m is two, the values of g that satisfy requirements 5 and 6 are between 3 and 15 inclusive, and the values of g that satisfy requirements 5A and 6A are between 6 and 15 inclusive. For the case where g is three and requirements 1 to 6 are satisfied, an example of the three second detection circuit groups to be formed in the first detection circuit group (1, 2, 3, 4, 5, 6) is the following example 1.

Example 1

(1, 2), (3, 4), and (5, 6)

For the case where g is six and requirements 1 to 4, 5A and 6A are satisfied, an example of the six second detection circuit groups to be formed in the first detection circuit group (1, 2, 3, 4, 5, 6) is the following example 2.

Example 2

(1, 2), (2, 3), (3, 4), (4, 5), (5, 6), and (6, 1)

[If N is Nine and M is Seven]

From requirement 3, if N is nine and M is seven, possible values of G are between 5 and 36 inclusive. If G is five, one of the five first detection circuit groups to be formed is the first detection circuit group (1, 2, 3, 4, 5, 6 7,). In this case, from requirement 4, possible values of m are between two and six inclusive. If m is three, the values of g that satisfy requirements 5 and 6 are between 3 and 35 inclusive, and the values of g that satisfy requirements 5A and 6A are between 7 and 35 inclusive. For the case where g is three and requirements 1 to 6 are satisfied, an example of the three second detection circuit groups to be formed in the first detection circuit group (1, 2, 3, 4, 5, 6 7,) is the following example 3.

Example 3

(1, 2, 3), (4, 5, 6), and (7, 1, 2)

For the case where g is seven and requirements 1 to 4, 5A and 6A are satisfied, an example of the seven second detection circuit groups to be formed in the first detection circuit group (1, 2, 3, 4, 5, 6 7,) is the following example 4.

Example 4

(1, 2, 3), (2, 3, 4), (3, 4, 5), (4, 5, 6), (5, 6, 7), (6, 7, 1), and (7, 1, 2)

[If N is Nine and M is Eight]

From requirement 3, if N is nine and M is eight, the only possible value of G is nine. When G is nine, one of the nine first detection circuit groups to be formed is the first detection circuit group (1, 2, 3, 4, 5, 6, 7, 8). In this case, from requirement 4, possible values of m are between two and seven inclusive. If m is four, the values of g that satisfy requirements 5 and 6 are between 2 and 70 inclusive, and the values of g that satisfy requirements 5A and 6A are between 8 and 70 inclusive. For the case where g is two and requirements 1 to 6 are satisfied, an example of the two second detection circuit groups to be formed in the first detection circuit group (1, 2, 3, 4, 5, 6, 7, 8) is the following example 5.

Example 5

(1, 2, 3, 4), and (5, 6, 7, 8)

For the case where g is eight and requirements 1 to 4, 5A and 6A are satisfied, an example of the eight second detection circuit groups to be formed in the first detection circuit group (1, 2, 3, 4, 5, 6, 7, 8) is the following example 6.

Example 6

(1, 2, 3, 4), (2, 3, 4, 5), (3, 4, 5, 6), (4, 5, 6, 7), (5, 6, 7, 8), (6, 7, 8, 1), (7, 8, 1, 2), and (8, 1, 2, 3)

According to the rotating field sensor 1 and the angle determination method of the first embodiment, even if one of the N detection circuits fails, there exists at least one first detection circuit group that the failed detection circuit does not belong to. The at least one first detection circuit group that the failed detection circuit does not belong to is distinguishable because all the g angle values corresponding to the g second detection circuit groups belonging thereto fall within an angle range of a predetermined breadth. By using such a characteristic, in the first embodiment, one or more normal first detection circuit groups are extracted to determine the angle detection value θs on the basis of at least one of all angle values corresponding to all second detection circuit groups belonging to the one or more normal first detection circuit groups. According to the first embodiment, a correct angle detection value θs can thus be output even if one of the detection circuits fails.

Further, the rotating field sensor 1 according to the first embodiment makes it possible to identify, in the case of a failure of one of the N detection circuits, the failed detection circuit by using the failure detection unit 80. Similarly, the angle determination method according to the first embodiment makes it possible to identify, in the case of a failure of one of the N detection circuits, the failed detection circuit in the third step S103.

A failed detection circuit generates an output signal different from that when the detection circuit is normal. A method for detecting a failure of a detection circuit by monitoring the output signal thereof is not capable of detecting the failure of the detection circuit with high sensitivity. More specifically, by such a method, it is difficult to detect such a failure of a detection circuit that the output signal of the detection circuit deviates from a predetermined normal value by a relatively small amount.

According to the first embodiment, in contrast, a failed detection circuit is identified on the basis of a plurality of angle values each calculated from the output signals of m detection circuits. Even in the case of such a failure of a detection circuit that the output signal of the detection circuit deviates from a predetermined normal value by a relatively small amount, the angle values change in a relatively noticeable manner as compared to normal time. The first embodiment is thus capable of detecting a failure of a detection circuit with higher sensitivity than the method for detecting a failure of a detection circuit by monitoring the output signal thereof.

Second Embodiment

Figure 10:
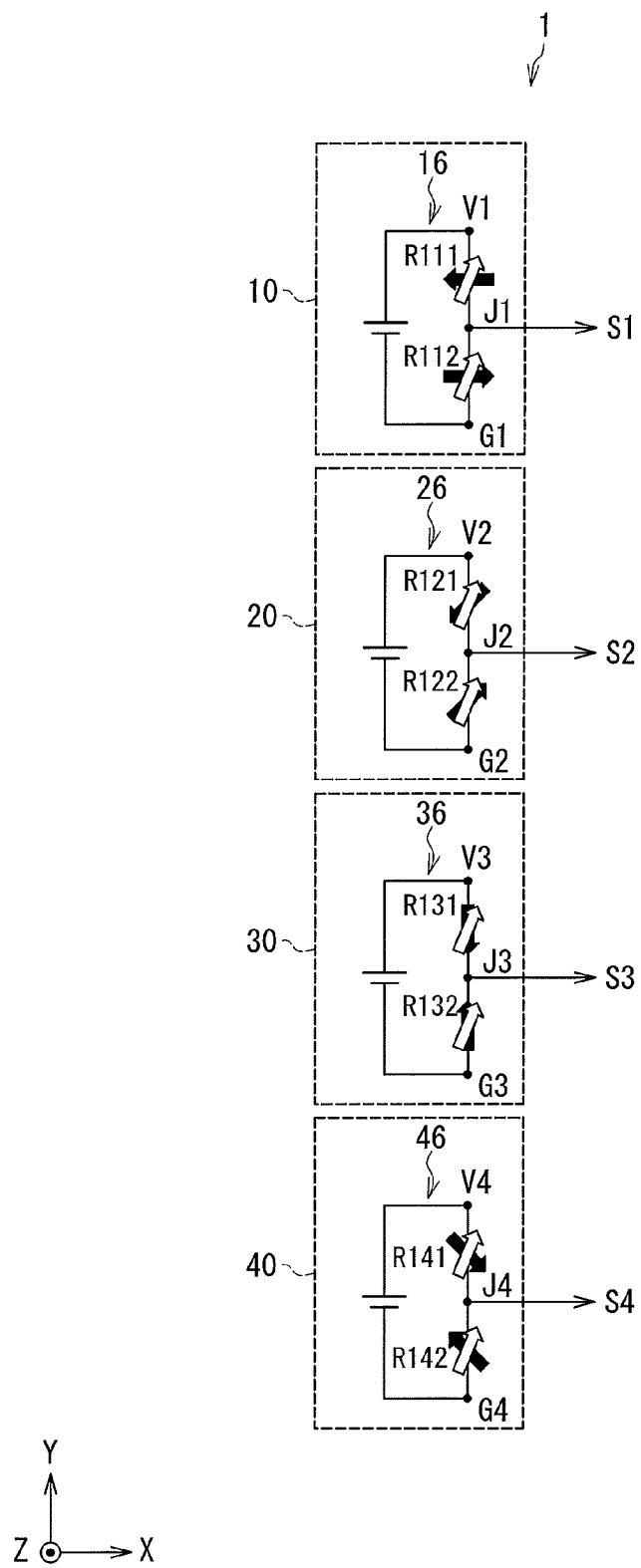
FIG. 10 is a circuit diagram illustrating a portion of a rotating field sensor according to a second embodiment of the invention.

A rotating field sensor according to a second embodiment of the invention will now be described with reference to FIG. 10. FIG. 10 is a circuit diagram illustrating the configuration of a portion of the rotating field sensor according to the second embodiment. In the second embodiment, the first detection circuit 10 includes a half-bridge circuit 16 in place of the Wheatstone bridge circuit 14 and the difference detector 15. The half-bridge circuit 16 includes a pair of serially connected MR elements R111 and R112. An end of the MR element R111 farther from the MR element R112 is connected to the power supply port V1. An end of the MR element R112 farther from the MR element R111 is connected to the ground port G1. The first output signal S1 is output from a junction J1 between the MR element R111 and the MR element R112.

The second detection circuit 20 includes a half-bridge circuit 26 in place of the Wheatstone bridge circuit 24 and the difference detector 25. The half-bridge circuit 26 includes a pair of serially connected MR elements R121 and R122. An end of the MR element R121 farther from the MR element R122 is connected to the power supply port V2. An end of the MR element R122 farther from the MR element R121 is connected to the ground port G2. The second output signal S2 is output from a junction J2 between the MR element R121 and the MR element R122.

The third detection circuit 30 includes a half-bridge circuit 36 in place of the Wheatstone bridge circuit 34 and the difference detector 35. The half-bridge circuit 36 includes a pair of serially connected MR elements R131 and R132. An end of the MR element R131 farther from the MR element R132 is connected to the power supply port V3. An end of the MR element R132 farther from the MR element R131 is connected to the ground port G3. The third output signal S3 is output from a junction J3 between the MR element R131 and the MR element R132.

The fourth detection circuit 40 includes a half-bridge circuit 46 in place of the Wheatstone bridge circuit 44 and the difference detector 45. The half-bridge circuit 46 includes a pair of serially connected MR elements R141 and R142. An end of the MR element R141 farther from the MR element R142 is connected to the power supply port V4. An end of the MR element R142 farther from the MR element R141 is connected to the ground port G4. The fourth output signal S4 is output from a junction J4 between the MR element R141 and the MR element R142.

The MR elements R111, R112, R121, R122, R131, R132, R141 and R142 are configured in the same manner as the MR elements R11, R12, R21, R22, R31, R32, R41 and R42 of the first embodiment. More specifically, in the first detection circuit 10, the magnetization direction of the magnetization pinned layer of the MR element R111 is the same as the first direction D1 (the −X direction) shown in FIG. 2 and described in the first embodiment section, and the magnetization direction of the magnetization pinned layer of the MR element R112 is opposite to that of the magnetization pinned layer of the MR element R111. In this case, the potential at the junction J1 varies depending on the relative angle between the direction DM of the rotating magnetic field MF and the first direction D1.

In the second detection circuit 20, the magnetization direction of the magnetization pinned layer of the MR element R121 is the same as the second direction D2 shown in FIG. 2 and described in the first embodiment section, and the magnetization direction of the magnetization pinned layer of the MR element R122 is opposite to that of the magnetization pinned layer of the MR element R121. In this case, the potential at the junction J2 varies depending on the relative angle between the direction DM of the rotating magnetic field MF and the second direction D2.

In the third detection circuit 30, the magnetization direction of the magnetization pinned layer of the MR element R131 is the same as the third direction D3 (the −Y direction) shown in FIG. 2 and described in the first embodiment section, and the magnetization direction of the magnetization pinned layer of the MR element R132 is opposite to that of the magnetization pinned layer of the MR element R131. In this case, the potential at the junction J3 varies depending on the relative angle between the direction DM of the rotating magnetic field MF and the third direction D3.

In the fourth detection circuit 40, the magnetization direction of the magnetization pinned layer of the MR element R141 is the same as the fourth direction D4 shown in FIG. 2 and described in the first embodiment section, and the magnetization direction of the magnetization pinned layer of the MR element R142 is opposite to that of the magnetization pinned layer of the MR element R141. In this case, the potential at the junction J4 varies depending on the relative angle between the direction DM of the rotating magnetic field MF and the fourth direction D4.

In the second embodiment, the two inputs of the first angle calculation circuit 61 shown in FIG. 4 and described in the first embodiment section are connected to the junction J1 of the first detection circuit 10 and the junction J2 of the second detection circuit 20. The two inputs of the second angle calculation circuit 62 are connected to the junction J2 of the second detection circuit 20 and the junction J3 of the third detection circuit 30. The two inputs of the third angle calculation circuit 63 are connected to the junction J3 of the third detection circuit 30 and the junction J4 of the fourth detection circuit 40. The two inputs of the fourth angle calculation circuit 64 are connected to the junction J4 of the fourth detection circuit 40 and the junction J1 of the first detection circuit 10. The two inputs of the fifth angle calculation circuit 65 are connected to the junction J3 of the third detection circuit 30 and the junction J1 of the first detection circuit 10. The two inputs of the sixth angle calculation circuit 66 are connected to the junction J4 of the fourth detection circuit 40 and the junction J2 of the second detection circuit 20.

The other configuration, operation, and effects of the second embodiment are the same as those of the first embodiment.

Third Embodiment

Figure 11:
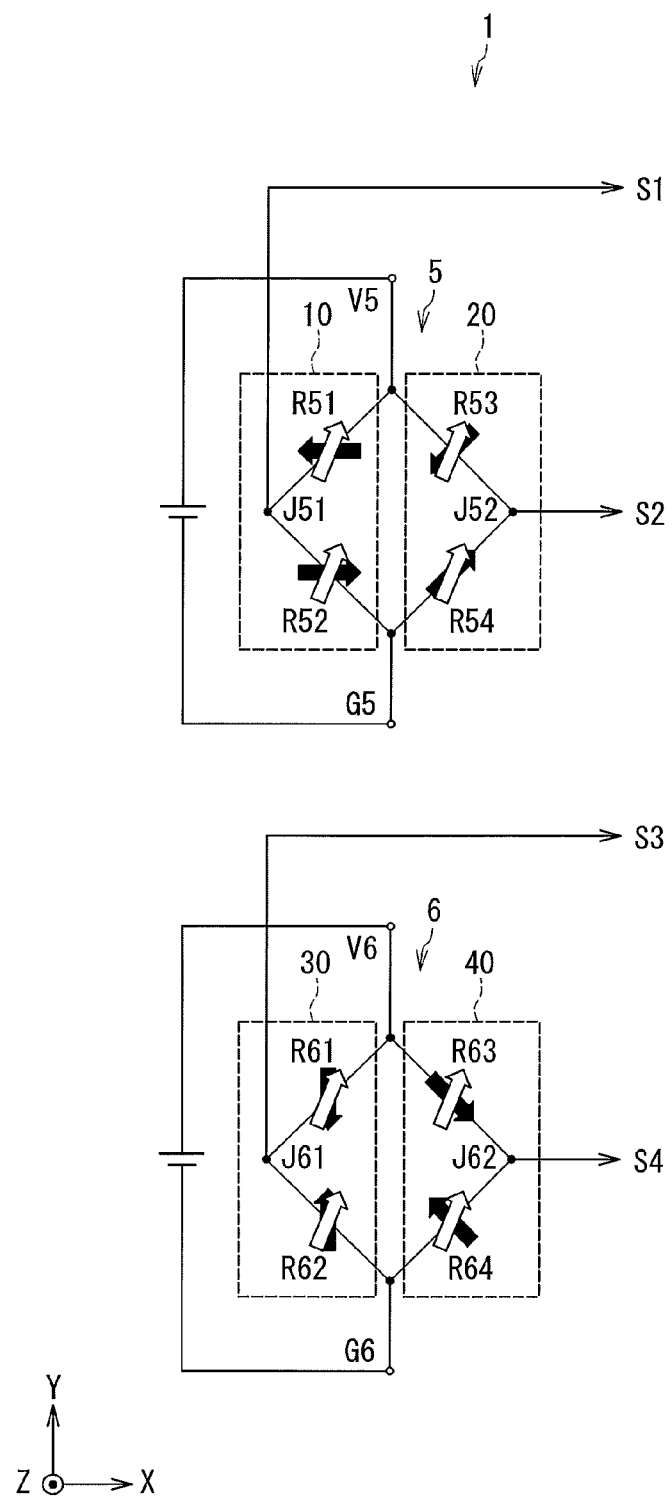
FIG. 11 is a circuit diagram illustrating a portion of a rotating field sensor according to a third embodiment of the invention.

A rotating field sensor according to a third embodiment of the invention will now be described with reference to FIG. 11. FIG. 11 is a circuit diagram illustrating the configuration of a portion of the rotating field sensor according to the third embodiment. The rotating field sensor 1 according to the third embodiment includes two Wheatstone bridge circuits 5 and 6 in place of the Wheatstone bridge circuits 14, 24, 34 and 44 of the first embodiment. The rotating field sensor 1 further includes power supply ports V5 and V6 and ground ports G5 and G6.

The Wheatstone bridge circuit 5 includes a first pair of serially connected MR elements R51 and R52 and a second pair of serially connected MR elements R53 and R54. An end of the MR element R51 farther from the MR element R52 is connected to an end of the MR element R53 farther from the MR element R54 and to the power supply port V5. An end of the MR element R52 farther from the MR element R51 is connected to an end of the MR element R54 farther from the MR element R53 and to the ground port G5. A predetermined voltage is applied between the power supply port V5 and the ground port G5. As a result, a predetermined voltage is applied between the end of the MR element R51 and the end of the MR element R52 farther from each other, and between the end of the MR element R53 and the end of the MR element R54 farther from each other.

The Wheatstone bridge circuit 6 includes a first pair of serially connected MR elements R61 and R62 and a second pair of serially connected MR elements R63 and R64. An end of the MR element R61 farther from the MR element R62 is connected to an end of the MR element R63 farther from the MR element R64 and to the power supply port V6. An end of the MR element R62 farther from the MR element R61 is connected to an end of the MR element R64 farther from the MR element R63 and to the ground port G6. A predetermined voltage is applied between the power supply port V6 and the ground port G6. As a result, a predetermined voltage is applied between the end of the MR element R61 and the end of the MR element R62 farther from each other, and between the end of the MR element R63 and the end of the MR element R64 farther from each other.

In the third embodiment, the first detection circuit 10 is composed of the MR elements R51 and R52. The second detection circuit 20 is composed of the MR elements R53 and R54. The third detection circuit 30 is composed of the MR elements R61 and R62. The fourth detection circuit 40 is composed of the MR elements R63 and R64. The first output signal S1 is output from a junction J51 between the MR element R51 and the MR element R52. The second output signal S2 is output from a junction J52 between the MR element R53 and the MR element R54. The third output signal S3 is output from a junction J61 between the MR element R61 and the MR element R62. The fourth output signal S4 is output from a junction J62 between the MR element R63 and the MR element R64.

The MR elements R51, R52, R53, R54, R61, R62, R63 and R64 are configured in the same manner as the MR elements R11, R12, R21, R22, R31, R32, R41 and R42 of the first embodiment. More specifically, in the first detection circuit 10, the magnetization direction of the magnetization pinned layer of the MR element R51 is the same as the first direction D1 (the −X direction) shown in FIG. 2 and described in the first embodiment section, and the magnetization direction of the magnetization pinned layer of the MR element R52 is opposite to that of the magnetization pinned layer of the MR element R51. In this case, the potential at the junction J51 varies depending on the relative angle between the direction DM of the rotating magnetic field MF and the first direction D1.

In the second detection circuit 20, the magnetization direction of the magnetization pinned layer of the MR element R53 is the same as the second direction D2 shown in FIG. 2 and described in the first embodiment section, and the magnetization direction of the magnetization pinned layer of the MR element R54 is opposite to that of the magnetization pinned layer of the MR element R53. In this case, the potential at the junction J52 varies depending on the relative angle between the direction DM of the rotating magnetic field MF and the second direction D2.

In the third detection circuit 30, the magnetization direction of the magnetization pinned layer of the MR element R61 is the same as the third direction D3 (the −Y direction) shown in FIG. 2 and described in the first embodiment section, and the magnetization direction of the magnetization pinned layer of the MR element R62 is opposite to that of the magnetization pinned layer of the MR element R61. In this case, the potential at the junction J61 varies depending on the relative angle between the direction DM of the rotating magnetic field MF and the third direction D3.

In the fourth detection circuit 40, the magnetization direction of the magnetization pinned layer of the MR element R63 is the same as the fourth direction D4 shown in FIG. 2 and described in the first embodiment section, and the magnetization direction of the magnetization pinned layer of the MR element R64 is opposite to that of the magnetization pinned layer of the MR element R63. In this case, the potential at the junction J62 varies depending on the relative angle between the direction DM of the rotating magnetic field MF and the fourth direction D4.

In the third embodiment, the two inputs of the first angle calculation circuit 61 shown in FIG. 4 and described in the first embodiment section are connected to the junctions J51 and J52 of the Wheatstone bridge circuit 5. The two inputs of the second angle calculation circuit 62 are connected to the junction J52 of the Wheatstone bridge circuit 5 and the junction J61 of the Wheatstone bridge circuit 6. The two inputs of the third angle calculation circuit 63 are connected to the junctions J61 and J62 of the Wheatstone bridge circuit 6. The two inputs of the fourth angle calculation circuit 64 are connected to the junction J62 of the Wheatstone bridge circuit 6 and the junction J51 of the Wheatstone bridge circuit 5. The two inputs of the fifth angle calculation circuit 65 are connected to the junction J61 of the Wheatstone bridge circuit 6 and the junction J51 of the Wheatstone bridge circuit 5. The two inputs of the sixth angle calculation circuit 66 are connected to the junction J62 of the Wheatstone bridge circuit 6 and the junction J52 of the Wheatstone bridge circuit 5.

The other configuration, operation, and effects of the third embodiment are the same as those of the first embodiment.

Fourth Embodiment

Figure 12:
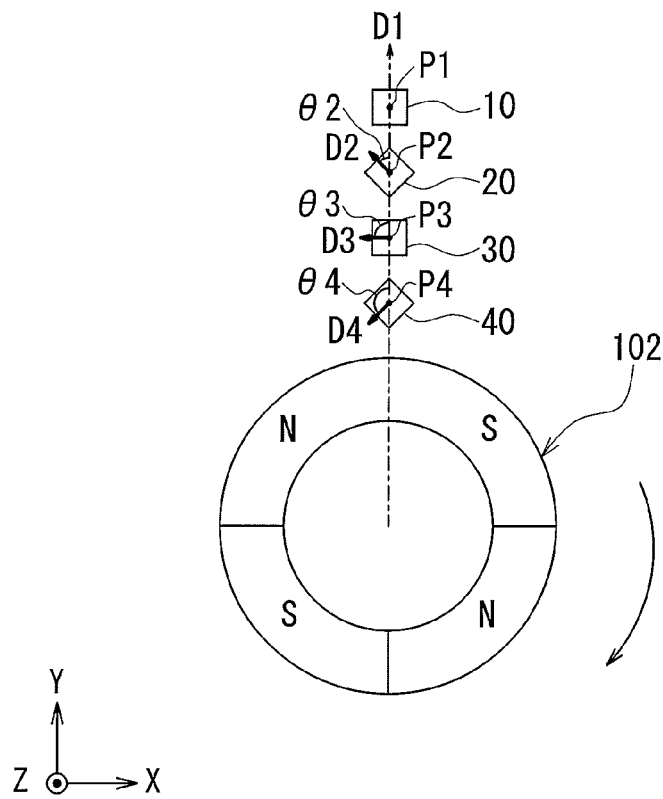
FIG. 12 is an explanatory diagram illustrating the configuration of a rotating field sensor according to a fourth embodiment of the invention.

A rotating field sensor according to a fourth embodiment of the invention will now be described with reference to FIG. 12. FIG. 12 is an explanatory diagram illustrating the configuration of the rotating field sensor according to the fourth embodiment. In FIG. 12, a magnet 102 including one or more pairs of N and S poles alternately arranged in a ring shape is shown as an example of means for generating a rotating magnetic field whose direction rotates. In the example shown in FIG. 12, the magnet 102 includes two pairs of N and S poles. The rotating field sensor 1 according to the fourth embodiment is configured to detect the direction of the rotating magnetic field generated from the outer periphery of the magnet 102. In the example shown in FIG. 12, the plane of the drawing of FIG. 12 is an XY plane, and a direction perpendicular to the plane is the Z direction. The N and S poles of the magnet 102 are arranged symmetrically with respect to the center of rotation parallel to the Z direction. The magnet 102 rotates about the center of rotation. As a result, a rotating magnetic field occurs on the basis of the magnetic field generated by the magnet 102. The rotating magnetic field rotates about the center of rotation (the Z direction). In the example shown in FIG. 12, the magnet 102 rotates in a clockwise direction, and the rotating magnetic field rotates in a counterclockwise direction.

In the fourth embodiment, the first position P1 where the first detection circuit 10 detects the rotating magnetic field, the second position P2 where the second detection circuit 20 detects the rotating magnetic field, the third position P3 where the third detection circuit 30 detects the rotating magnetic field, and the fourth position P4 where the fourth detection circuit 40 detects the rotating magnetic field are the same in the direction of rotation of the magnet 102. Thus, in the fourth embodiment the first to fourth detection circuits 10, 20, 30 and 40 are located in the same position in the direction of rotation of the magnet 102.

In the example shown in FIG. 12, the first direction D1, which is a direction of the rotating magnetic field that maximizes the first output signal S1 generated by the first detection circuit 10, is set in a radial direction of the magnet 102. The second direction D2, which is a direction of the rotating magnetic field that maximizes the second output signal S2 generated by the second detection circuit 20, is the direction rotated counterclockwise by θ2 from the first direction D1 in the XY plane. The third direction D3, which is a direction of the rotating magnetic field that maximizes the third output signal S3 generated by the third detection circuit 30, is the direction rotated counterclockwise by θ3 from the first direction D1 in the XY plane. The fourth direction D4, which is a direction of the rotating magnetic field that maximizes the fourth output signal S4 generated by the fourth detection circuit 40, is the direction rotated counterclockwise by θ4 from the first direction D1 in the XY plane. In the fourth embodiment, θ2, θ3 and θ4 are specifically 45°, 90° and 135°, respectively.

The rotating field sensor 1 shown in FIG. 12 is otherwise configured in the same manner as any of the first to third embodiments.

Modification Example

Figure 13:
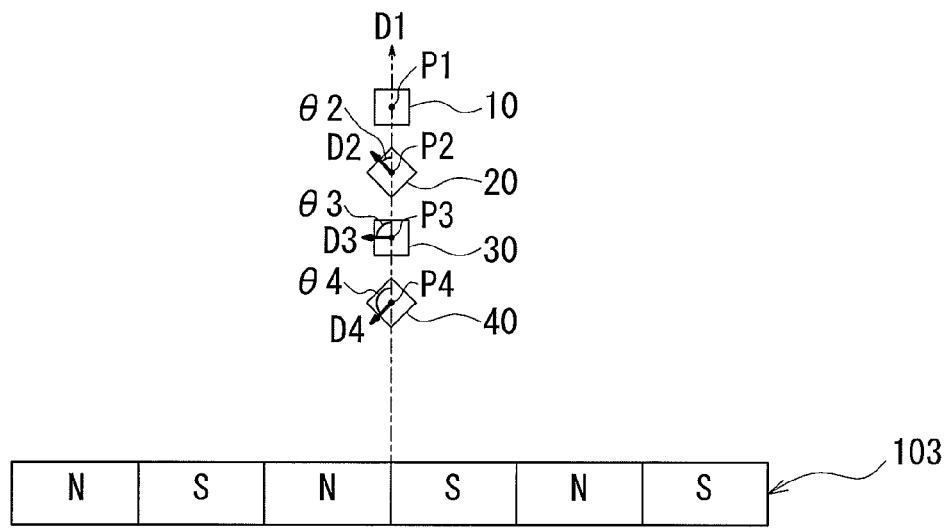
FIG. 13 is an explanatory diagram illustrating the configuration of a rotating field sensor of a modification example of the fourth embodiment of the invention.

A modification example of the fourth embodiment will now be described with reference to FIG. 13. FIG. 13 is an explanatory diagram illustrating the configuration of a rotating field sensor of the modification example of the fourth embodiment. In FIG. 13, a magnet 103 including a plurality of pairs of N and S poles alternately arranged in a linear configuration is shown as an example of means for generating a rotating magnetic field whose direction rotates. The rotating field sensor 1 of the modification example is configured to detect the direction of the rotating magnetic field generated from the outer periphery of the magnet 103. In the example shown in FIG. 13, the plane of the drawing of FIG. 13 is the XY plane, and a direction perpendicular to the plane is the Z direction. The magnet 103 moves linearly in its longitudinal direction in response to a linear movement of an object. As a result, a rotating magnetic field occurs on the basis of the magnetic field generated by the magnet 103. The rotating magnetic field rotates about the Z direction.

In the example shown in FIG. 13, the first direction D1 is set in a direction orthogonal to the direction of movement of the magnet 103 in the XY plane. The second direction D2 is the direction rotated counterclockwise by θ2, that is, 45°, from the first direction D1 in the XY plane. The third direction D3 is the direction rotated counterclockwise by θ3, that is, 90°, from the first direction D1 in the XY plane. The fourth direction D4 is the direction rotated counterclockwise by θ4, that is, 135°, from the first direction D1 in the XY plane. The rotating field sensor 1 shown in FIG. 13 is otherwise configured in the same manner as the rotating field sensor 1 shown in FIG. 12.

For the sake of convenience, in FIG. 12 and FIG. 13 the first to fourth detection circuits 10, 20, 30 and 40 are depicted as being spaced from each other in the Y direction. However, the locations of the first to fourth detection circuits 10, 20, 30 and 40 in the Y direction are preferably close to each other, and more preferably identical with each other.

The other configuration, operation, and effects of the fourth embodiment are the same as those of any of the first to third embodiments.

Fifth Embodiment

Figure 14:
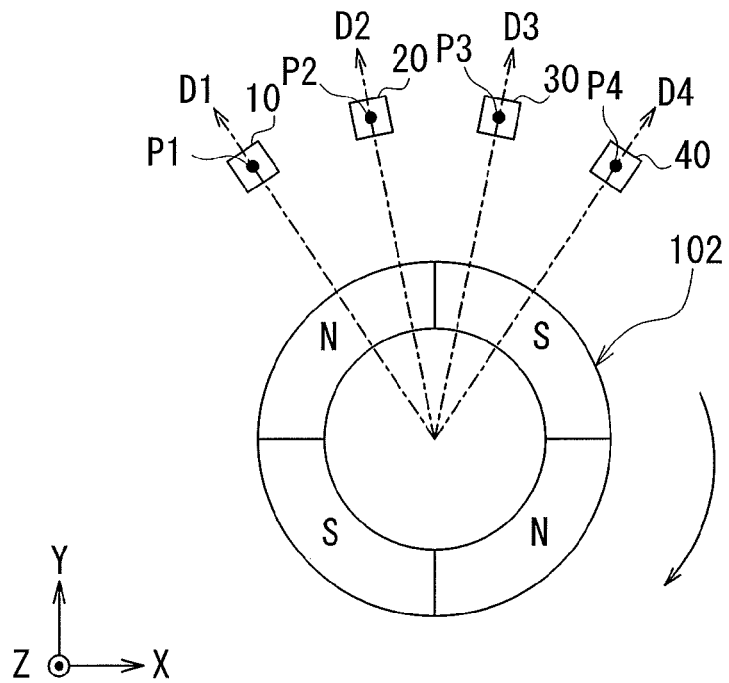
FIG. 14 is an explanatory diagram illustrating the configuration of a rotating field sensor according to a fifth embodiment of the invention.

A rotating field sensor according to a fifth embodiment of the invention will now be described with reference to FIG. 14. FIG. 14 is an explanatory diagram illustrating the configuration of the rotating field sensor according to the fifth embodiment. The rotating field sensor 1 according to the fifth embodiment is configured to detect the direction of a rotating magnetic field generated from the outer periphery of the magnet 102, as in the example of the fourth embodiment shown in FIG. 12. In the rotating field sensor 1 according to the fifth embodiment, the first position P1 where the first detection circuit 10 detects the rotating magnetic field, the second position P2 where the second detection circuit 20 detects the rotating magnetic field, the third position P3 where the third detection circuit 30 detects the rotating magnetic field, and the fourth position P4 where the fourth detection circuit 40 detects the rotating magnetic field are different from each other in the direction of rotation of the magnet 102. More specifically, in the fifth embodiment, the first to fourth detection circuits 10, 20, 30 and 40 are located at different positions in the direction of rotation of the magnet 102.

In the example shown in FIG. 14, the magnet 102 includes two pairs of N and S poles. The rotating magnetic field makes two rotations during one rotation of the magnet 102. In this case, one period of the first to fourth output signals S1 to S4, i.e., an electrical angle of 360°, is equivalent to a one-half rotation of the magnet 102, i.e., a 180-degree angle of rotation of the magnet 102. In FIG. 14, the difference between the first position P1 and the second position P2, the difference between the second position P2 and the third position P3, and the difference between the third position P3 and the fourth position P4 are all 45° in electrical angle, i.e., 22.5° in the angle of rotation of the magnet 102. Further, the difference between the first position P1 and the third position P3 is 90° in electrical angle, i.e., 45° in the angle of rotation of the magnet 102, and the difference between the first position P1 and the fourth position P4 is 135° in electrical angle, i.e., 67.5° in the angle of rotation of the magnet 102.

In the example shown in FIG. 14, the first direction D1 which is a direction of the rotating magnetic field that maximizes the first output signal S1 generated by the first detection circuit 10, the second direction D2 which is a direction of the rotating magnetic field that maximizes the second output signal S2 generated by the second detection circuit 20, the third direction D3 which is a direction of the rotating magnetic field that maximizes the third output signal S3 generated by the third detection circuit 30, and the fourth direction D4 which is a direction of the rotating magnetic field that maximizes the fourth output signal S4 generated by the fourth detection circuit 40 are all set in radial directions of the magnet 102. The rotating field sensor 1 shown in FIG. 14 is otherwise configured in the same manner as any of the first to third embodiments.

Modification Example

Figure 15:
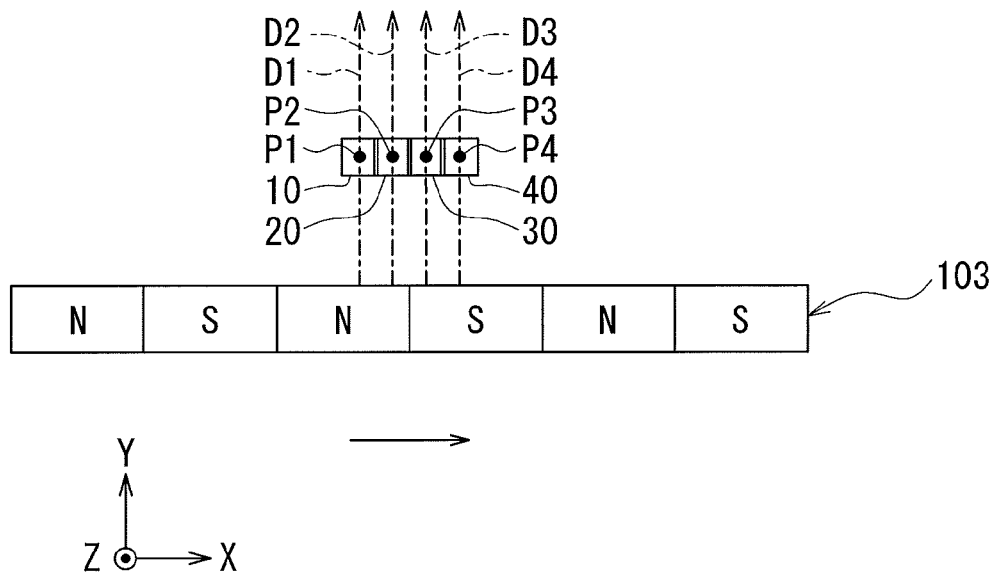
FIG. 15 is an explanatory diagram illustrating the configuration of a rotating field sensor of a modification example of the fifth embodiment of the invention.

A modification example of the fifth embodiment will now be described with reference to FIG. 15. FIG. 15 is an explanatory diagram illustrating the configuration of a rotating field sensor of the modification example of the fifth embodiment. The rotating field sensor 1 of the modification example is configured to detect the direction of a rotating magnetic field generated from the outer periphery of the magnet 103, as in the example of the fourth embodiment shown in FIG. 13. In the example shown in FIG. 15, the rotating magnetic field makes one rotation while the magnet 103 moves by one pitch, i.e., as much as a pair of N and S poles. In this case, one period of the first to fourth output signals S1 to S4, i.e., 360° in electrical angle, is equivalent to one pitch of the magnet 103. In FIG. 15, the difference between the first position P1 and the second position P2, the difference between the second position P2 and the third position P3, and the difference between the third position P3 and the fourth position P4 are all ⅛ pitch. Further, the difference between the first position P1 and the third position P3 is ¼ pitch, and the difference between the first position P1 and the fourth position P4 is ⅜ pitch.

In the example shown in FIG. 15, the first to fourth directions D1 to D4 are all set in a direction orthogonal to the direction of movement of the magnet 103 in the XY plane. The rotating field sensor 1 shown in FIG. 15 is otherwise configured in the same manner as the rotating field sensor 1 shown in FIG. 14.

The other configuration, operation, and effects of the fifth embodiment are the same as those of any of the first to fourth embodiments.

The present invention is not limited to the foregoing embodiments, and various modifications may be made thereto. For example, the arrangement of the first to fourth detection circuits 10, 20, 30 and 40 and the first to fourth directions D1 to D4 in the foregoing embodiments are illustrative only. Various modifications may be made to the arrangement of the first to fourth detection circuits 10, 20, 30 and 40 and the first to fourth directions D1 to D4 within the scope of the requirements set forth in the claims.

In the second to fifth embodiments, the first to fourth detection circuits 10, 20, 30 and 40 in the rotating field sensor 1 may be replaced with N detection circuits in accordance with any of the examples listed in discussing the possible values of M, G, m, and g in the first embodiment section.

Further, in the present invention, the magnetic detection elements are not limited to spin-valve MR elements (GMR elements or TMR elements) as long as the detection circuits including the magnetic detection elements can generate output signals responsive to the direction DM of the rotating magnetic field MF. For example, AMR elements, Hall elements, fluxgate magnetic sensors and the like may be used as the magnetic detection elements.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A rotating field sensor for detecting an angle that a direction of a rotating magnetic field in a reference position forms with respect to a reference direction, the rotating field sensor comprising:

N detection circuits, each of the N detection circuits including at least one magnetic detection element and generating an output signal responsive to the direction of the rotating magnetic field; and a computing unit for performing a computation for determining an angle detection value to be output from the rotating field sensor, by using N output signals of the N detection circuits, the angle detection value having a correspondence relationship with the angle that the direction of the rotating magnetic field in the reference position forms with respect to the reference direction, wherein in the computing unit, G first detection circuit groups are defined and further, g second detection circuit groups are defined in each of the G first detection circuit groups, each of the G first detection circuit groups consisting of M detection circuits selected from the N detection circuits, each of the g second detection circuit groups consisting of m detection circuits selected from the M detection circuits, N is an integer not less than four, M is an integer not less than three and not more than (N−1), each of the N detection circuits belongs to one or more and not more than (G−1) of the G first detection circuit groups, m is an integer not less than two and not more than (M−1), g is an integer not less than M/m and not more than $_MC_m$, in each of the G first detection circuit groups, each of the M detection circuits belongs to one or more and not more than (g−1) of the g second detection circuit groups, and the computing unit includes:

an angle calculation unit for calculating an angle value for each of all the second detection circuit groups on the basis of m output signals of the m detection circuits, the angle value having a correspondence relationship with the angle that the direction of the rotating magnetic field in the reference position forms with respect to the reference direction; and an angle determination unit configured to extract one or more normal first detection circuit groups from the G first detection circuit groups, each of the one or more normal first detection circuit groups being such a first detection circuit group that all g angle values corresponding to the g second detection circuit groups belonging thereto fall within an angle range of a predetermined breadth, and to determine the angle detection value on the basis of at least one of all angle values corresponding to all second detection circuit groups belonging to the one or more normal first detection circuit groups.

2. The rotating field sensor according to claim 1, wherein g is greater than or equal to M,
in each of the G first detection circuit groups, each of the M detection circuits belongs to m or more second detection circuit groups,
the computing unit further includes a failure detection unit for identifying, in the case of a failure of one of the N detection circuits, the failed detection circuit, the failure detection unit being configured to: set an angle value range of a predetermined breadth in which the all angle values corresponding to the all second detection circuit groups belonging to the one or more normal first detection circuit groups are included as a normal angle value range; extract a plurality of abnormal first detection circuit groups other than the one or more normal first detection circuit groups from the G first detection circuit groups; classify all angle values corresponding to all second detection circuit groups belonging to the plurality of abnormal first detection circuit groups into normal angle values falling within the normal angle value range and abnormal angle values falling outside the normal angle value range; and identify a detection circuit that belongs to all second detection circuit groups corresponding to all the abnormal angle values and does not belong to any of second detection circuit groups corresponding to all the normal angle values as the failed detection circuit.

3. The rotating field sensor according to claim 1, wherein the at least one magnetic detection element is at least one magnetoresistive element including: a magnetization pinned layer whose magnetization direction is pinned; a free layer whose magnetization direction varies depending on the direction of the rotating magnetic field; and a nonmagnetic layer disposed between the magnetization pinned layer and the free layer.

4. An angle determination method for determining an angle detection value by using a rotating field sensor, the angle detection value having a correspondence relationship with an angle that a direction of a rotating magnetic field in a reference position forms with respect to a reference direction,
the rotating field sensor including N detection circuits and being configured to output the angle detection value, each of the N detection circuits including at least one magnetic detection element and generating an output signal responsive to the direction of the rotating magnetic field,
G first detection circuit groups being defined in advance and further, g second detection circuit groups being defined in each of the G first detection circuit groups in advance, each of the G first detection circuit groups consisting of M detection circuits selected from the N detection circuits, each of the g second detection circuit groups consisting of m detection circuits selected from the M detection circuits,
N being an integer not less than four,
M being an integer not less than three and not more than (N−1),
each of the N detection circuits belonging to one or more and not more than (G−1) of the G first detection circuit groups,
m being an integer not less than two and not more than (M−1),
g being an integer not less than M/m and not more than $_MC_m$,
in each of the G first detection circuit groups, each of the M detection circuits belonging to one or more and not more than (g−1) of the g second detection circuit groups,
the angle determination method determining the angle detection value by performing a computation using N output signals of the N detection circuits, and comprising:
a first step of calculating an angle value for each of all the second detection circuit groups on the basis of m output signals of the m detection circuits, the angle value having a correspondence relationship with the angle that the direction of the rotating magnetic field in the reference position forms with respect to the reference direction; and
a second step of: extracting one or more normal first detection circuit groups from the G first detection circuit groups, each of the one or more normal first detection circuit groups being such a first detection circuit group that all g angle values corresponding to the g second detection circuit groups belonging thereto fall within an angle range of a predetermined breadth; and determining the angle detection value on the basis of at least one of all angle values corresponding to all second detection circuit groups belonging to the one or more normal first detection circuit groups.

5. The angle determination method according to claim 4, wherein
g is greater than or equal to M,
in each of the G first detection circuit groups, each of the M detection circuits belongs to m or more second detection circuit groups, and
the angle determination method further comprises a third step of identifying, in the case of a failure of one of the N detection circuits, the failed detection circuit, the third step including:
setting an angle value range of a predetermined breadth in which the all angle values corresponding to the all second detection circuit groups belonging to the one or more normal first detection circuit groups are included as a normal angle value range;
extracting a plurality of abnormal first detection circuit groups other than the one or more normal first detection circuit groups from the G first detection circuit groups;
classifying all angle values corresponding to all second detection circuit groups belonging to the plurality of abnormal first detection circuit groups into normal angle values falling within the normal angle value range and abnormal angle values falling outside the normal angle value range; and
identifying a detection circuit that belongs to all second detection circuit groups corresponding to all the abnormal angle values and does not belong to any of second detection circuit groups corresponding to all the normal angle values as the failed detection circuit.

6. The angle determination method according to claim 4, wherein the at least one magnetic detection element is at least one magnetoresistive element including: a magnetization pinned layer whose magnetization direction is pinned; a free layer whose magnetization direction varies depending on the direction of the rotating magnetic field; and a nonmagnetic layer disposed between the magnetization pinned layer and the free layer.

* * * * *